United States Patent
Johnsen et al.

(10) Patent No.: US 10,764,178 B2
(45) Date of Patent: *Sep. 1, 2020

(54) SYSTEM AND METHOD FOR SUPPORTING RESOURCE QUOTAS FOR INTRA AND INTER SUBNET MULTICAST MEMBERSHIP IN A HIGH PERFORMANCE COMPUTING ENVIRONMENT

(71) Applicant: Oracle International Corporation, Redwood Shores, CA (US)

(72) Inventors: Bjørn Dag Johnsen, Oslo (NO); Bartosz Bogdański, Oslo (NO); Line Holen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,412

(22) Filed: Feb. 6, 2019

(65) Prior Publication Data

US 2019/0173786 A1  Jun. 6, 2019

Related U.S. Application Data

(63) Continuation of application No. 15/415,576, filed on Jan. 25, 2017, now Pat. No. 10,230,631.

(Continued)

(51) Int. Cl.
*H04L 12/741* (2013.01)
*H04L 12/24* (2006.01)
(Continued)

(52) U.S. Cl.
CPC .......... *H04L 45/74* (2013.01); *G06F 9/45558* (2013.01); *H04L 12/18* (2013.01);
(Continued)

(58) Field of Classification Search
CPC ......... H04L 41/12; H04L 69/22; H04L 47/23; H04L 49/00; H04L 41/046;
(Continued)

(56) References Cited

U.S. PATENT DOCUMENTS 6,006,090 A  12/1999  Coleman et al.
6,851,059 B1  2/2005  Pfister et al.
(Continued)

OTHER PUBLICATIONS

United States Patent and Trademark Office, Office Action dated Jul. 12, 2019 for U.S. Appl. No. 15/416,917, 12 pages.

(Continued)

*Primary Examiner* — Man U Phan
(74) *Attorney, Agent, or Firm* — Tucker Ellis LLP

(57) ABSTRACT

Systems and methods for supporting resource quotas for multicast group creation and membership in a high performance computing environment. In accordance with an embodiment, multicast group membership can present an issue in that inter-subnet partitions can, if left unchecked, runaway with multicast group creation within any given connected subnet. This can starve address map resources at router ports. A quota can be supplied that provides a maximum number of multicast groups any given inter-subnet partition is allowed to create within any given subnet.

17 Claims, 20 Drawing Sheets

Related U.S. Application Data

(60) Provisional application No. 62/287,720, filed on Jan. 27, 2016.

(51) Int. Cl.

| | | |
|---|---|---|
| *H04L 29/12* | (2006.01) | |
| *H04L 12/931* | (2013.01) | |
| *H04L 12/18* | (2006.01) | |
| *H04L 29/06* | (2006.01) | |
| *H04L 12/733* | (2013.01) | |
| *H04L 12/713* | (2013.01) | |
| *H04L 12/815* | (2013.01) | |
| *H04L 12/937* | (2013.01) | |
| *H04L 12/46* | (2006.01) | |
| *H04L 12/751* | (2013.01) | |
| *H04L 12/753* | (2013.01) | |
| *H04L 12/933* | (2013.01) | |
| *G06F 9/455* | (2018.01) | |
| *H04L 12/761* | (2013.01) | |
| *H04L 12/721* | (2013.01) | |
| *H04L 29/08* | (2006.01) | |

(52) U.S. Cl.
CPC ........ *H04L 12/185* (2013.01); *H04L 12/1886* (2013.01); *H04L 12/4641* (2013.01); *H04L 41/046* (2013.01); *H04L 41/082* (2013.01); *H04L 41/12* (2013.01); *H04L 45/02* (2013.01); *H04L 45/16* (2013.01); *H04L 45/20* (2013.01); *H04L 45/26* (2013.01); *H04L 45/48* (2013.01); *H04L 45/586* (2013.01); *H04L 45/745* (2013.01); *H04L 47/23* (2013.01); *H04L 49/00* (2013.01); *H04L 49/15* (2013.01); *H04L 49/253* (2013.01); *H04L 49/354* (2013.01); *H04L 49/358* (2013.01); *H04L 49/70* (2013.01); *H04L 61/10* (2013.01); *H04L 61/2514* (2013.01); *H04L 61/35* (2013.01); *H04L 63/06* (2013.01); *H04L 69/22* (2013.01); *G06F 2009/4557* (2013.01); *G06F 2009/45595* (2013.01); *H04L 61/6004* (2013.01); *H04L 61/6059* (2013.01); *H04L 61/6068* (2013.01); *H04L 63/02* (2013.01); *H04L 67/10* (2013.01)

(58) Field of Classification Search
CPC ..... H04L 12/1886; H04L 45/20; H04L 45/16; H04L 49/15; H04L 45/26; H04L 49/358; H04L 67/10; H04L 61/6059; H04L 45/74; H04L 12/18; H04L 61/10; H04L 61/6004; H04L 63/02; H04L 41/082; H04L 45/02; H04L 49/70; H04L 12/185; H04L 45/586; H04L 45/745; H04L 61/2514; H04L 61/6068; H04L 45/48; H04L 49/253; H04L 12/4641; H04L 63/06; H04L 49/354; H04L 61/35; H04L 12/741; H04L 12/937; H04L 12/931; H04L 29/12; H04L 12/751; H04L 12/815; H04L 12/24; H04L 12/733; H04L 12/46; H04L 12/713; H04L 12/721; H04L 12/761; H04L 29/06; H04L 12/933; H04L 12/753; G06F 9/45558; G06F 2009/4557; G06F 2009/45595; G06F 9/455
USPC ...................................................... 370/390
See application file for complete search history.

(56) References Cited

U.S. PATENT DOCUMENTS

| | | |
|---|---|---|
| 7,093,024 B2 | 8/2006 | Craddock et al. |
| 7,099,955 B1 | 8/2006 | Gregg et al. |
| 7,185,025 B2 | 2/2007 | Rosenstock et al. |
| 7,277,956 B2* | 10/2007 | Horen ............... H04L 47/10 348/E5.008 |
| 7,373,660 B1 | 5/2008 | Guichard et al. |
| 7,409,432 B1* | 8/2008 | Recio ............... H04L 41/12 370/254 |
| 7,983,265 B1 | 7/2011 | Dropps |
| 8,009,589 B2* | 8/2011 | Burrow ............... H04L 12/462 370/254 |
| 8,009,693 B2* | 8/2011 | Liao ............... H04L 29/06 370/401 |
| 8,127,003 B2 | 2/2012 | Glaeser et al. |
| 8,713,649 B2* | 4/2014 | Johnsen ............... H04L 41/32 726/5 |
| 8,775,713 B2* | 7/2014 | Chandra ............ G06F 13/4081 710/316 |
| 8,989,187 B2 | 3/2015 | Saraiya et al. |
| 9,219,718 B2* | 12/2015 | Johnsen ............... H04L 9/3234 |
| 9,268,798 B2 | 2/2016 | de Lavarene et al. |
| 9,529,878 B2 | 12/2016 | Johnsen et al. |
| 2003/0023896 A1 | 1/2003 | Kashyap |
| 2003/0208572 A1 | 11/2003 | Shah et al. |
| 2004/0024903 A1 | 2/2004 | Costatino et al. |
| 2004/0030763 A1* | 2/2004 | Manter ............... H04L 41/044 709/223 |
| 2004/0190546 A1 | 9/2004 | Jackson |
| 2005/0071472 A1 | 3/2005 | Arndt et al. |
| 2005/0071709 A1 | 3/2005 | Rosenstock et al. |
| 2005/0144313 A1 | 6/2005 | Arndt et al. |
| 2006/0006905 A1 | 1/2006 | Chou et al. |
| 2006/0056424 A1 | 3/2006 | Lih et al. |
| 2006/0230219 A1 | 10/2006 | Njoku et al. |
| 2008/0095160 A1 | 4/2008 | Yadav et al. |
| 2009/0216853 A1 | 8/2009 | Burrow et al. |
| 2010/0214952 A1 | 8/2010 | Gallagher et al. |
| 2012/0307682 A1 | 12/2012 | Johnsen et al. |
| 2012/0311123 A1 | 12/2012 | Johnsen et al. |
| 2012/0311682 A1 | 12/2012 | Johnsen et al. |
| 2012/0314706 A1 | 12/2012 | Liss et al. |
| 2013/0054947 A1 | 2/2013 | Gavrilov |
| 2013/0121149 A1 | 5/2013 | Guay et al. |
| 2013/0166798 A1 | 6/2013 | Chandra et al. |
| 2013/0254321 A1 | 9/2013 | Johnsen et al. |
| 2013/0254404 A1 | 9/2013 | Johnsen et al. |
| 2013/0266009 A1 | 10/2013 | Colloff et al. |
| 2013/0301646 A1 | 11/2013 | Bogdanski et al. |
| 2014/0177639 A1 | 6/2014 | Vershkov et al. |
| 2014/0241208 A1 | 8/2014 | Johnsen et al. |
| 2014/0241355 A1 | 8/2014 | Tsirkin |
| 2014/0269686 A1 | 9/2014 | Srinivasan et al. |
| 2014/0379756 A1 | 12/2014 | Shivarudraiah et al. |
| 2015/0026213 A1 | 1/2015 | Hegde et al. |
| 2015/0030034 A1 | 1/2015 | Bogdanski et al. |
| 2015/0098466 A1 | 4/2015 | Haramaty et al. |
| 2015/0098475 A1 | 4/2015 | Jayanarayana et al. |
| 2015/0338909 A1 | 11/2015 | Woodruff |
| 2016/0013973 A1* | 1/2016 | Onoue ............... H04L 45/586 370/254 |
| 2016/0072816 A1 | 3/2016 | Makhervaks et al. |
| 2016/0218929 A1 | 7/2016 | Bhuyan |
| 2016/0277210 A1 | 9/2016 | Lin et al. |
| 2017/0214537 A1 | 7/2017 | Johnsen et al. |
| 2017/0230257 A1 | 8/2017 | Bruun |
| 2017/0339106 A1 | 11/2017 | Rimmer et al. |

OTHER PUBLICATIONS

United States Patent and Trademark Office, Office Action dated Jul. 25, 2019 for U.S. Appl. No. 16/291,886, 9 pages.
United States Patent and Trademark Office, Notice of Allowance dated Jul. 31, 2019 for U.S. Appl. No. 15/414,437, 9 pages.

(56) References Cited

OTHER PUBLICATIONS

United States Patent and Trademark Office, Office Action dated Mar. 22, 2018 for U.S. Appl. No. 15/413,152, 10 Pages.
United States Patent and Trademark Office, Office Action dated Apr. 12, 2018 for U.S. Appl. No. 15/413,149, 12 Pages.
United States Patent and Trademark Office, Office Action dated Oct. 5, 2018 for U.S. Appl. No. 15/414,253, 37 Pages.
United States Patent and Trademark Office, Office Action dated Apr. 8, 2019 for U.S. Appl. No. 15/414,353, 38 Pages.
United States Patent and Trademark Office, Notice of Allowance dated Apr. 10, 2019 for U.S. Appl. No. 15/415,510, 13 Pages.
United States Patent and Trademark Office, Notice of Allowance dated Apr. 12, 2019 for U.S. Appl. No. 15/414,277, 12 Pages.
United States Patent and Trademark Office, Office Action dated May 31, 2019 for U.S. Appl. No. 15/415,517, 24 Pages.
United States Patent and Trademark Office, Office Action dated Oct. 30, 2019 for U.S. Appl. No. 16/040,110, 20 Pages.
United States Patent and Trademark Office, Notice of Allowance dated Feb. 26, 2020 for U.S. Appl. No. 16/040,110, 6 pages.
Mauch, et al., "High performance cloud computing", Future Generation Computer Systems 29 (2013), pp. 1408-1416, 9 pages.
United States Patent and Trademark Office, Notice of Allowance dated Dec. 17, 2019 for U.S. Appl. No. 15/416,917, 9 pages.
United States Patent and Trademark Office, Office Action dated Jan. 13, 2020 for U.S. Appl. No. 16/291,886, 10 pages.

* cited by examiner

SYSTEM AND METHOD FOR SUPPORTING RESOURCE QUOTAS FOR INTRA AND INTER SUBNET MULTICAST MEMBERSHIP IN A HIGH PERFORMANCE COMPUTING ENVIRONMENT

CLAIM OF PRIORITY AND CROSS REFERENCE TO RELATED APPLICATIONS

This application is a continuation of and claims the benefit of priority to U.S. Patent Application entitled "SYSTEM AND METHOD FOR SUPPORTING RESOURCE QUOTAS FOR INTRA AND INTER SUBNET MULTICAST MEMBERSHIP IN A HIGH PERFORMANCE COMPUTING ENVIRONMENT", application Ser. No. 15/415,576, filed on Jan. 27, 2017, now U.S. Pat. No. 10,230,631, which application claims the benefit of priority to U.S. Provisional Patent Application entitled "SYSTEM AND METHOD FOR USING MULTIPLE LIDS PER VIRTUAL ROUTER PORT IN ORDER TO UTILIZE SWITCH LFT BASED FORWARDING FOR BOTH LOCAL ROUTER PORT AND REMOTE TRAFFIC", Application No. 62/287,720, filed on Jan. 27, 2016, each of which applications are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting resource quotas for intra and inter subnet multicast membership in a high performance computing environment.

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Described herein are systems and methods for supporting resource quotas for multicast group creation and membership in a high performance computing environment, in accordance with an embodiment. A method can provide, at one or more computers, including one or more microprocessors, a first subnet, the first subnet comprising a plurality of switches, the plurality of switches comprising at least a leaf switch, wherein each of the plurality of switches comprise a plurality of switch ports, a plurality of end nodes, wherein the plurality of end nodes are interconnected via the plurality of switches; a subnet manager, the subnet manager running on one of the plurality of switches and the plurality of end nodes; and an inter-subnet manager (ISM), the inter-subnet manager running on one of the plurality of switches and the plurality of end nodes. A method can configure a switch port of the plurality of switch ports as a router port. A method can interconnect the first subnet with a second subnet via the switch port configured as a router port. A method can assign an end node of the plurality of end nodes to an inter-subnet partition (ISP) of a plurality of inter-subnet partitions. A method can assign, by the subnet manager to the ISP of the plurality of inter-subnet partitions, a quota of multicast groups.

In accordance with an embodiment, one or more host channel adapters can be provided (in the first or second subnet or both), and can comprise at least one virtual function, at least one virtual switch, and at least one physical function. The plurality of end nodes (of the first or second subnet) can comprise physical hosts, virtual machines, or a combination of physical hosts and virtual machines, wherein the virtual machines are associated with at least one virtual function.

DETAILED DESCRIPTION

Figure 1:
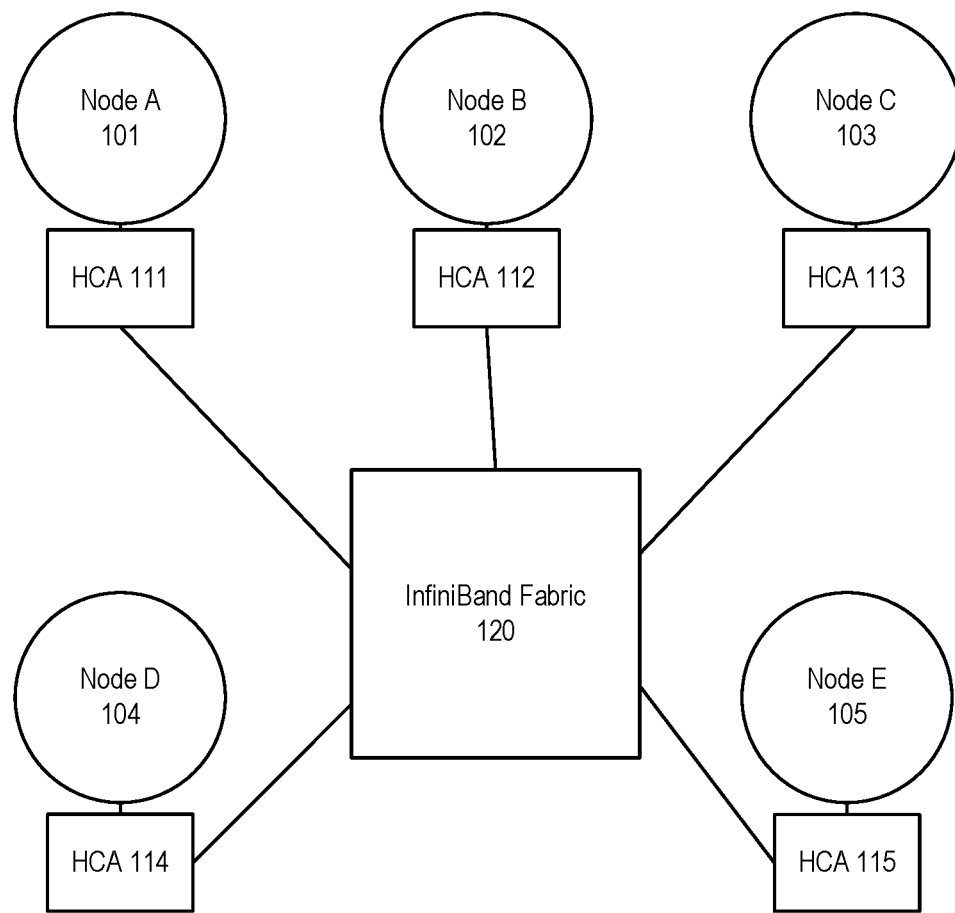
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for supporting resource quotas for multicast membership in a high performance computing environment, in accordance with an embodiment.

The following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-10V) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
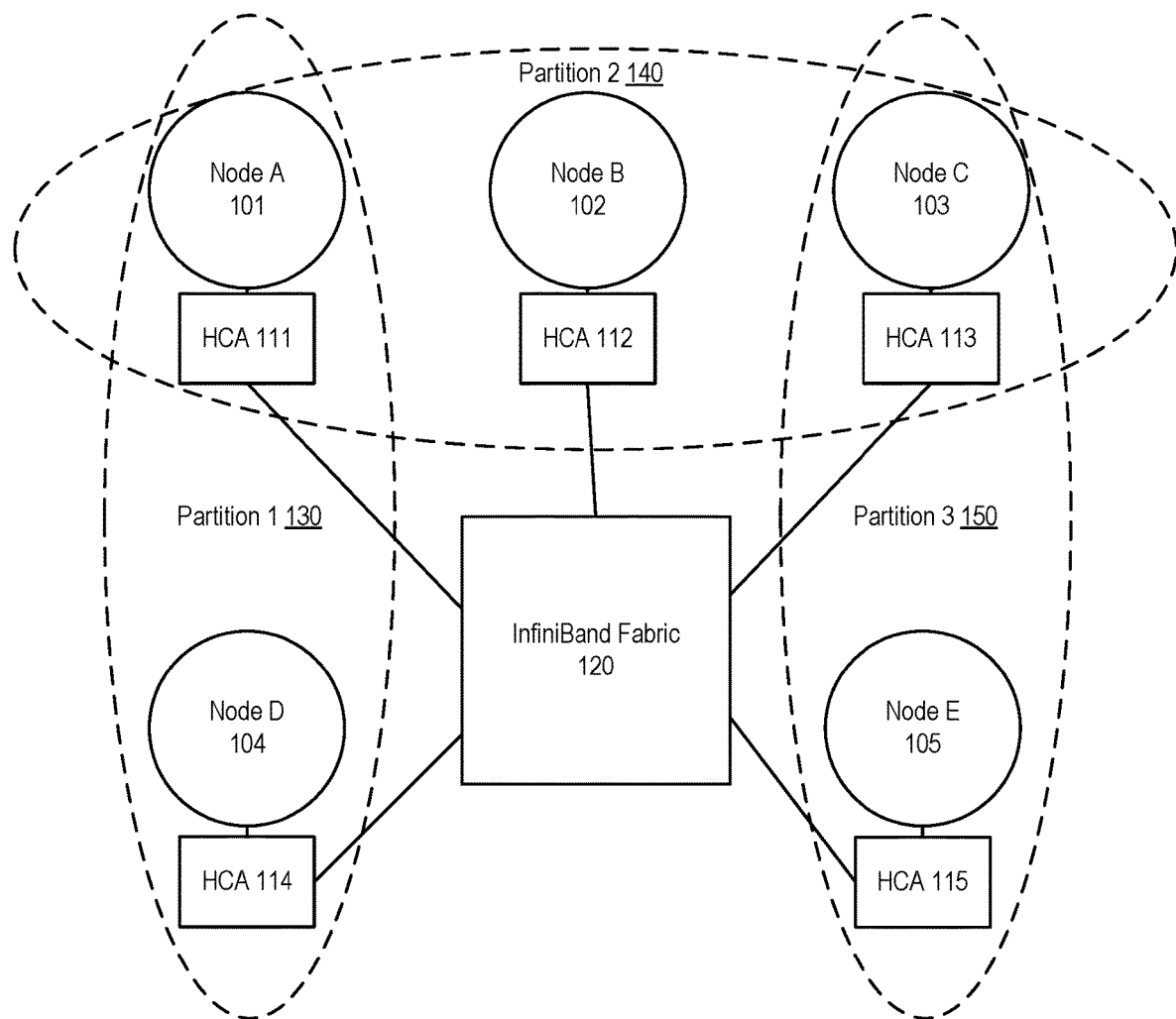
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
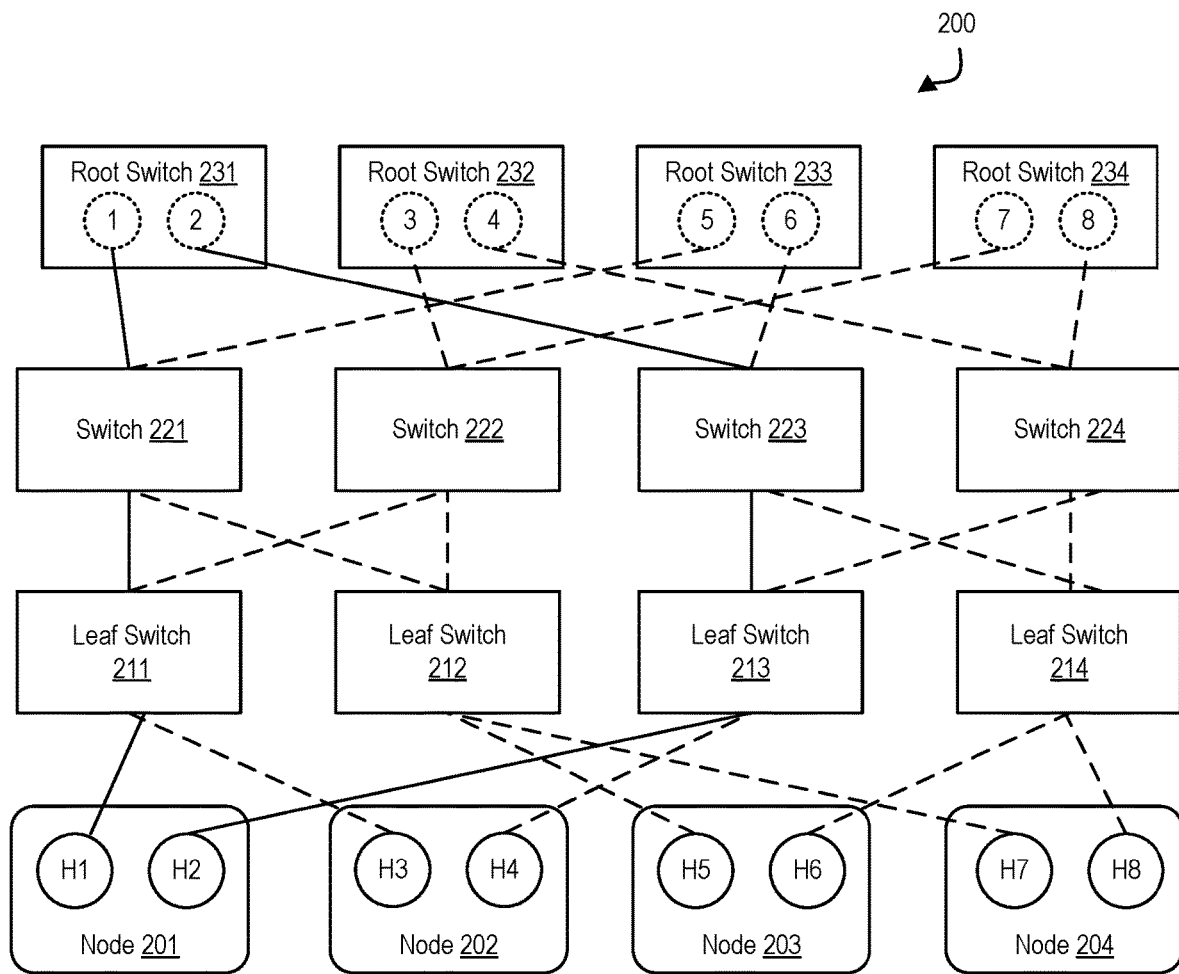
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2 k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
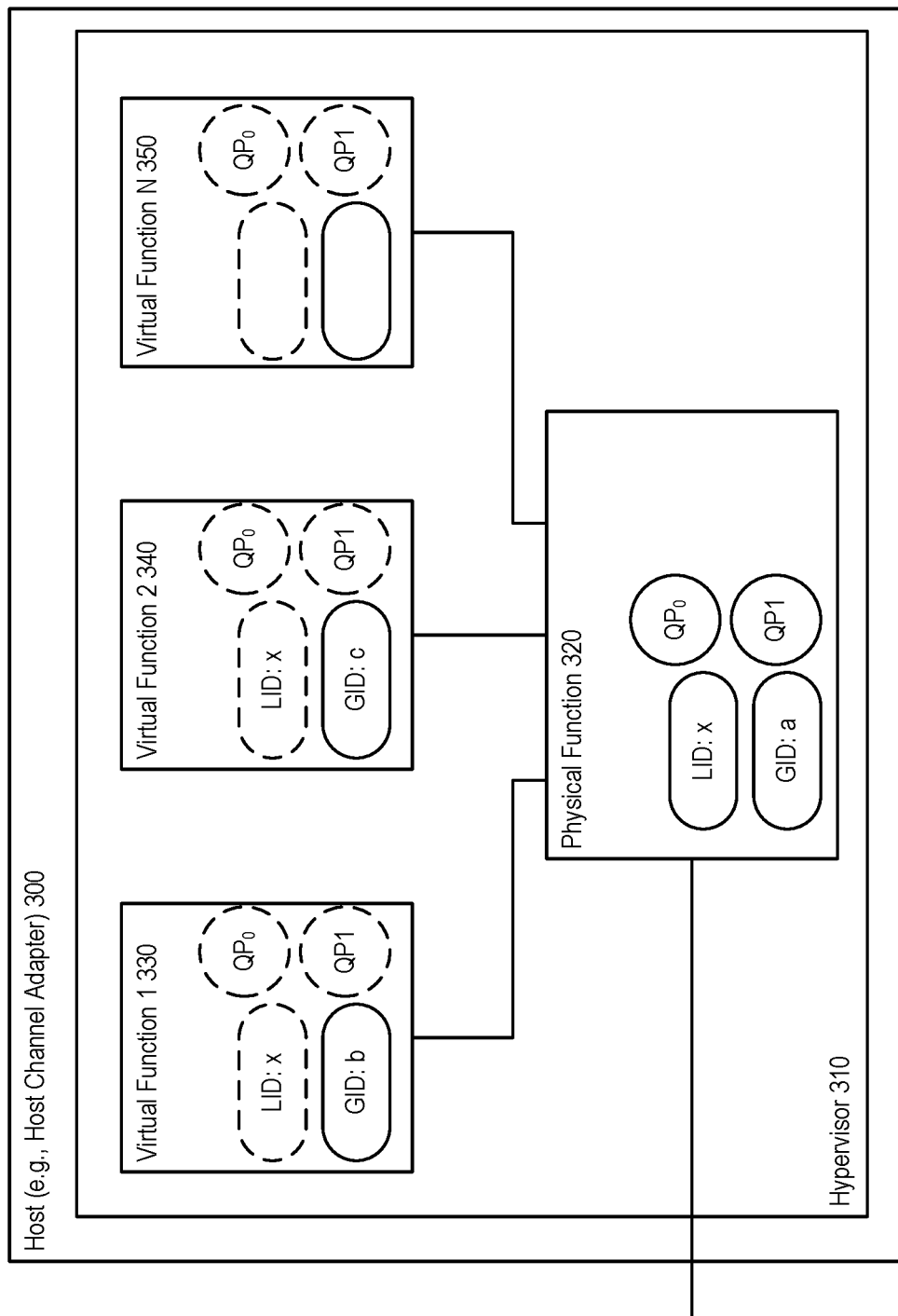
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
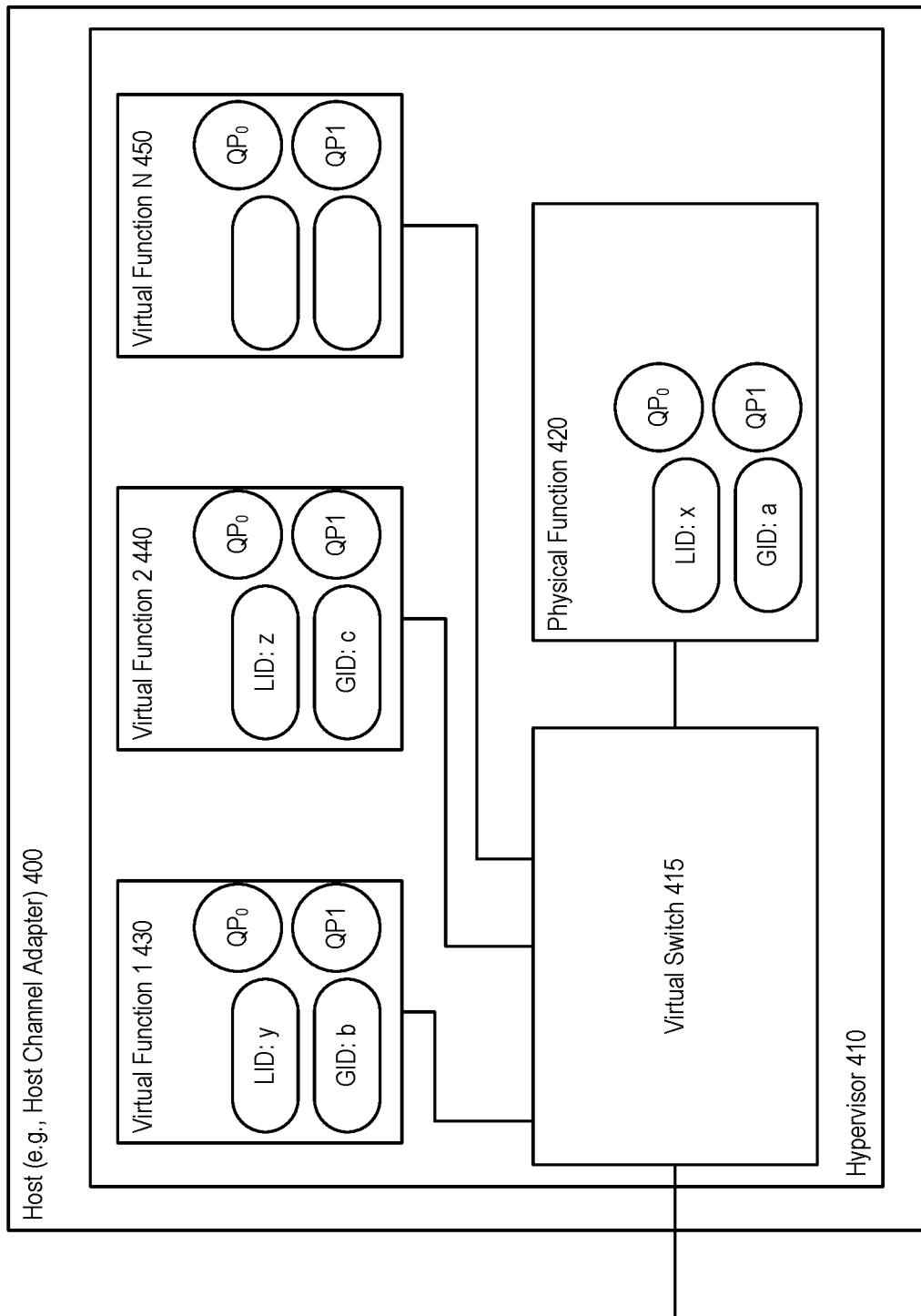
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
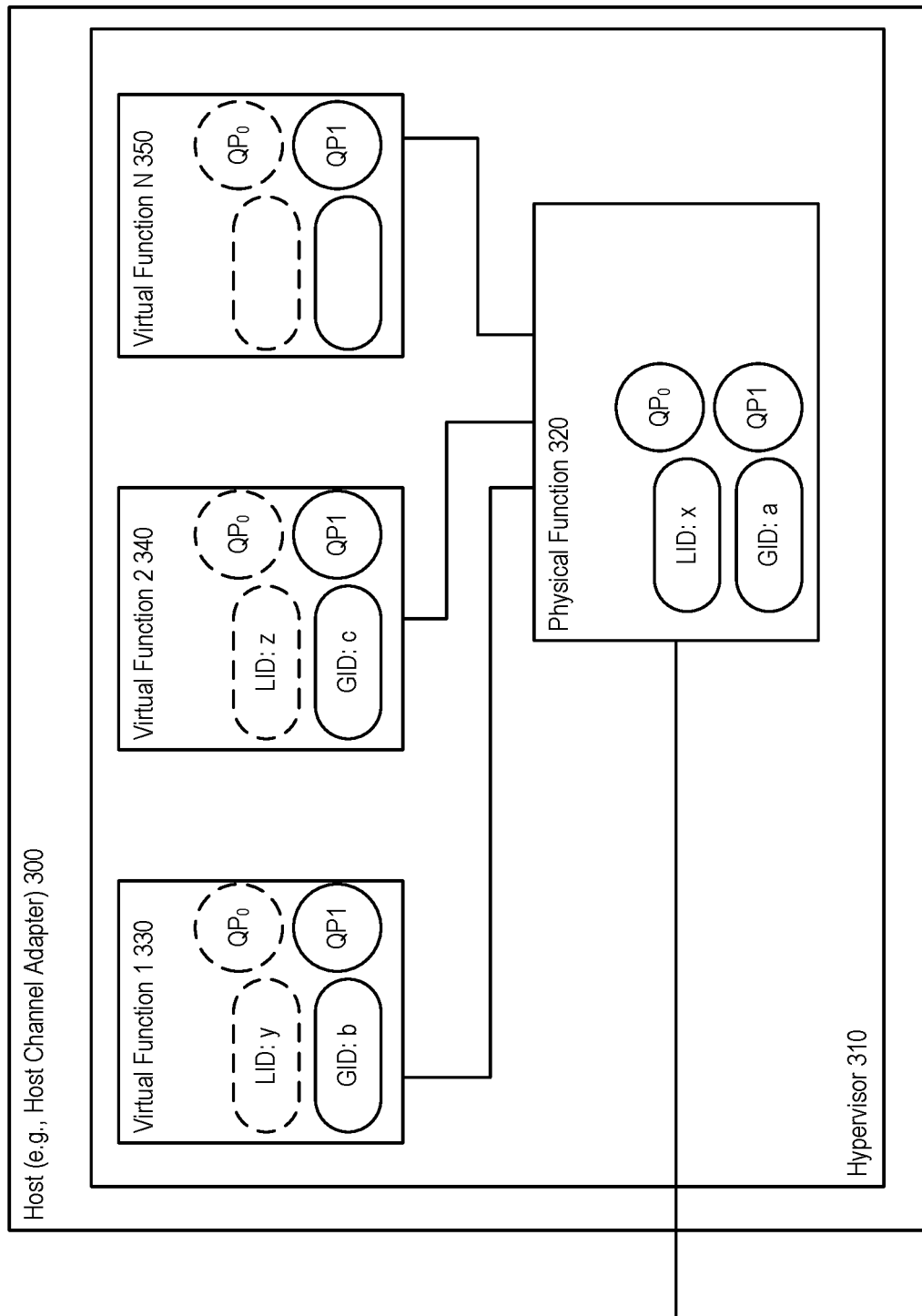
FIG. 6 shows an exemplary vPort architecture, in accordance with an embodiment.

FIG. 6 shows an exemplary vPort concept, in accordance with an embodiment. As depicted in the figure, a host 300

(e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
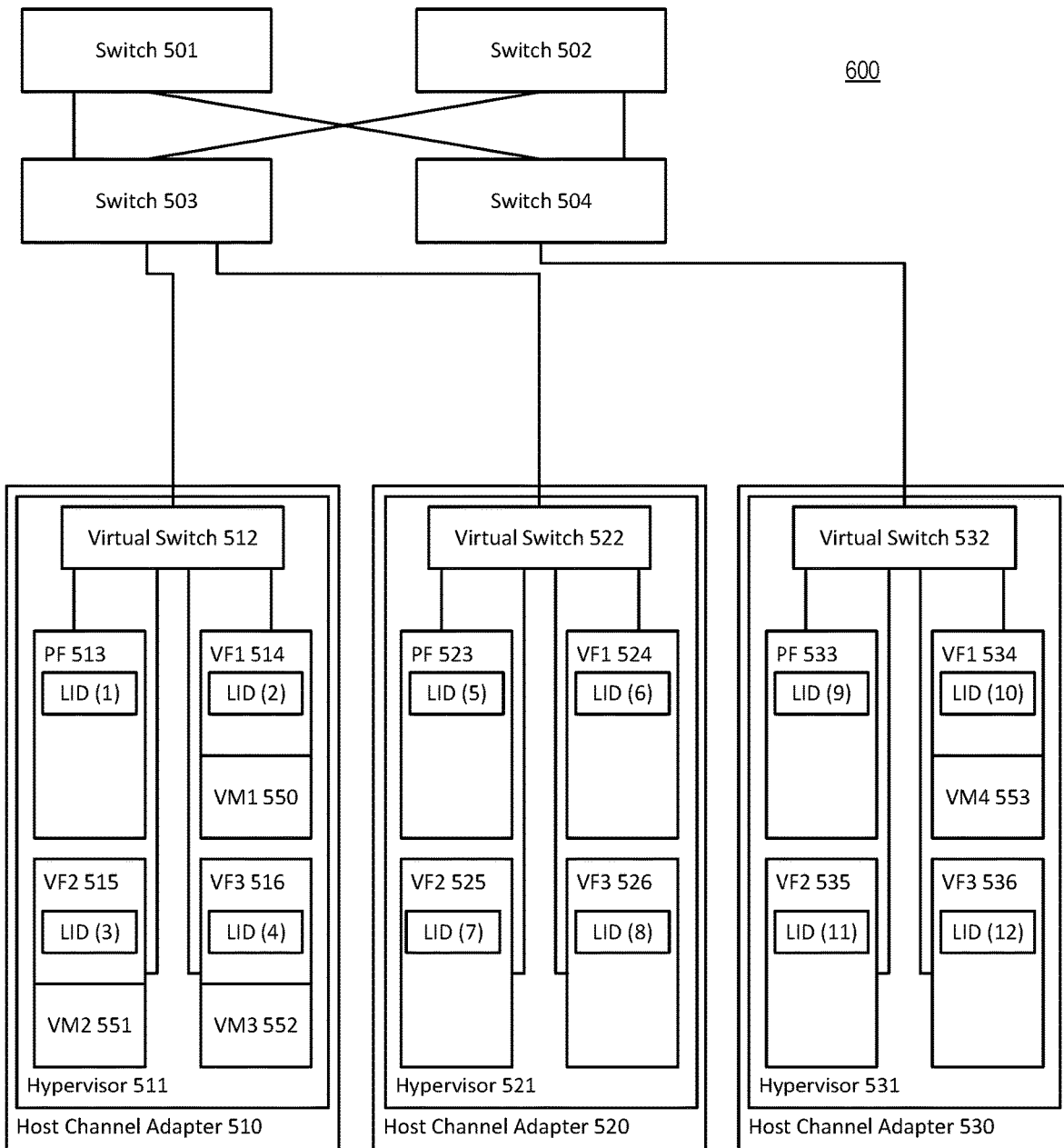
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
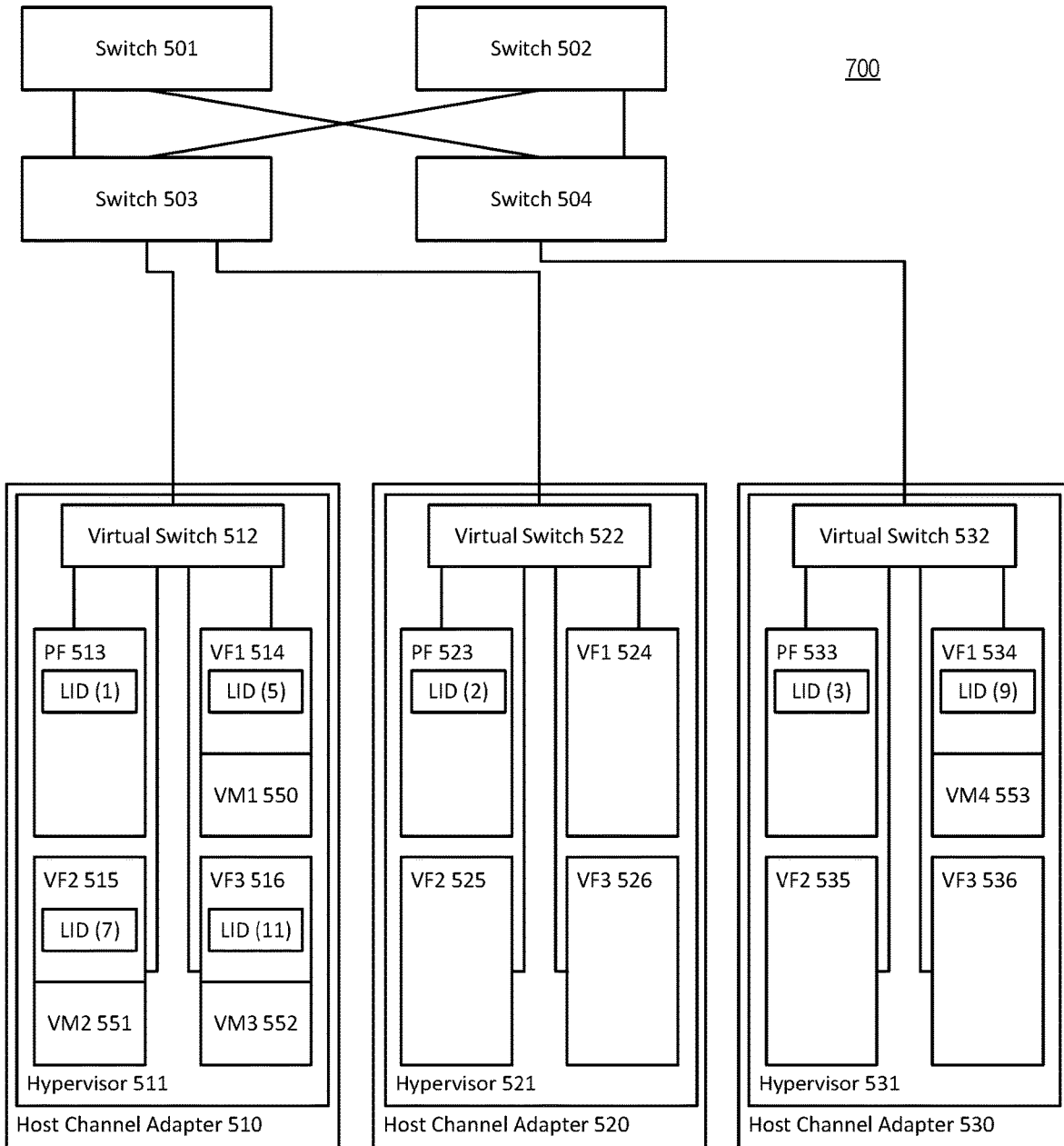
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
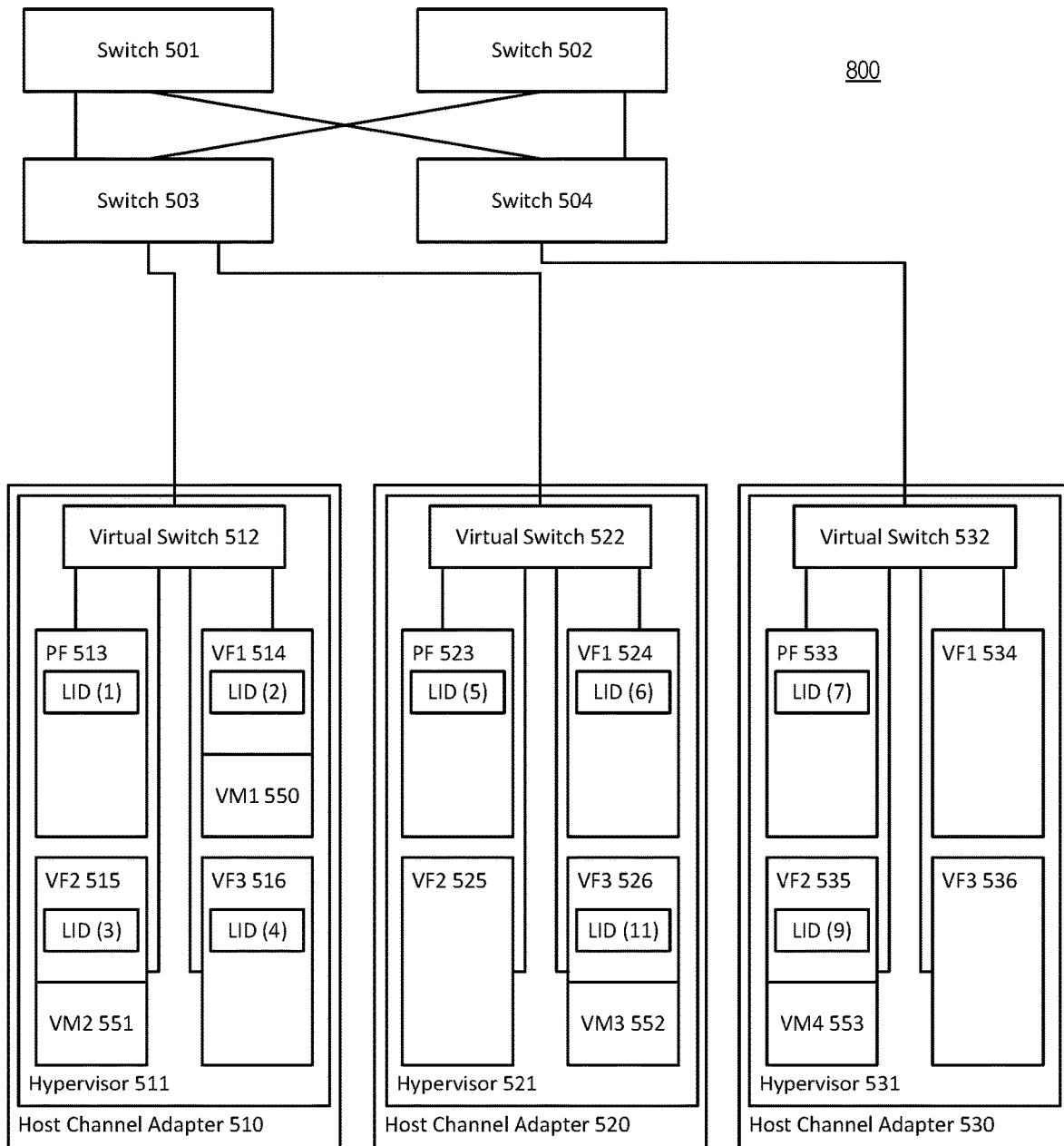
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
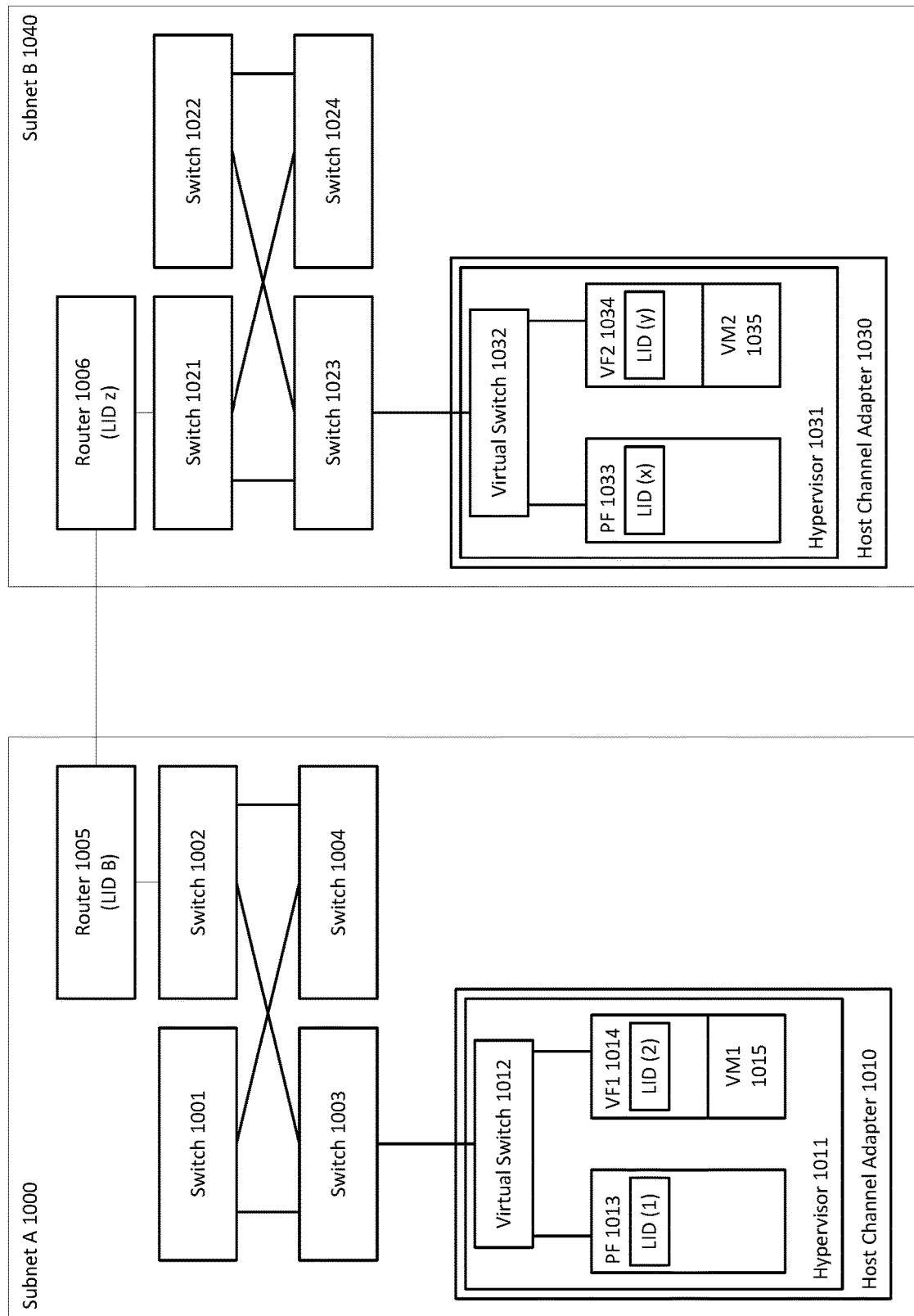
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapter 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet B 1040 (e.g., an IB subnet) between members of a fabric, such as an InfiniBand fabric. The fabric can include a number of hardware devices, such as, for example, channel adapter 1030. Host channel adapter 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, create a fabric profile (e.g., a virtual machine fabric profile), build virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination in a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching.

In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet, and without impacting the routing and logical connectivity within either of the incorrectly connected subnets.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
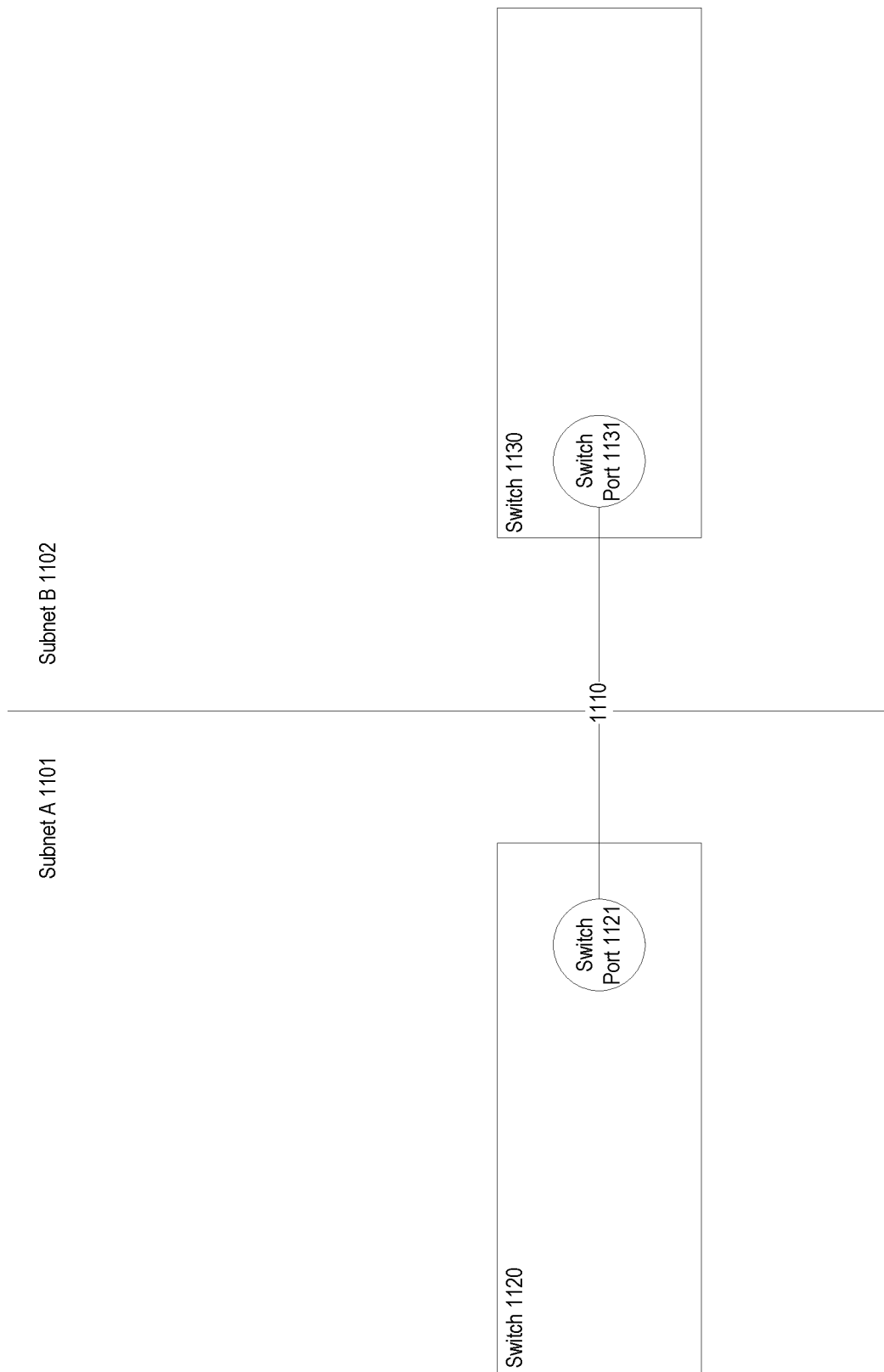
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnet A 1101 can be connected through a switch port 1121 of switch 1120, via a physical connection 1110, to a switch 1130 in subnet B 1102, via a switch port 1131 of switch 1130. In such an embodiment, each switch port, 1121 and 1131, can act both as switch ports and router ports.

In accordance with an embodiment, a problem with this configuration is that a management entity, such as a subnet manager in an InfiniBand subnet, cannot distinguish between a physical port that is both a switch port and a router port. In such a situation, a SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
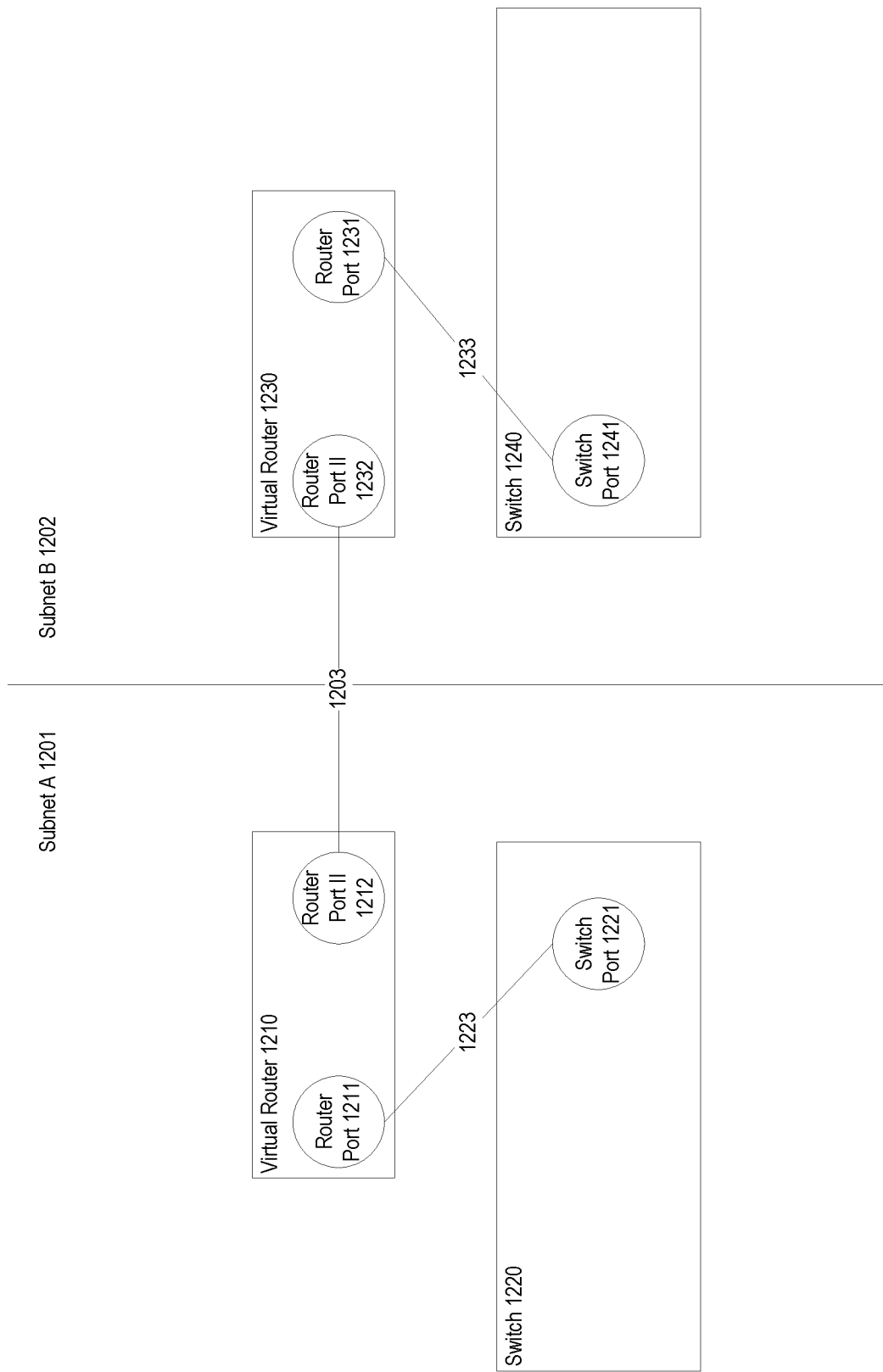
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnetA 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnetA 1201 via first end of the physical link with subnet B 1202 via a second end of the physical link, via router port II 1212 and router port II 1232, contained in virtual router 1230 in subnet B 1202. Virtual router 1230 can additionally comprise router port 1231, which can be connected (i.e., logically connected) to switch port 1241 on switch 1240 via a virtual link 1233.

In accordance with an embodiment, a subnet manager (not shown) on subnetA can detect router port 1211, on virtual router 1210 as an end point of the subnet that the subnet manager controls. The dual-port virtual router abstraction can allow the subnet manager on subnetA to deal with subnetA in a usual manner (e.g., as defined per the InifiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continue to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connected to some other switch port in the same subnet, or to a switch port that was not intended to provide a connection to another subnet. Therefore, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on the local side, a system does not have to provide an external, independent management entity. That is, each side of a subnet to subnet connection can be responsible for configuring its own dual-port virtual router.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

Figure 13:
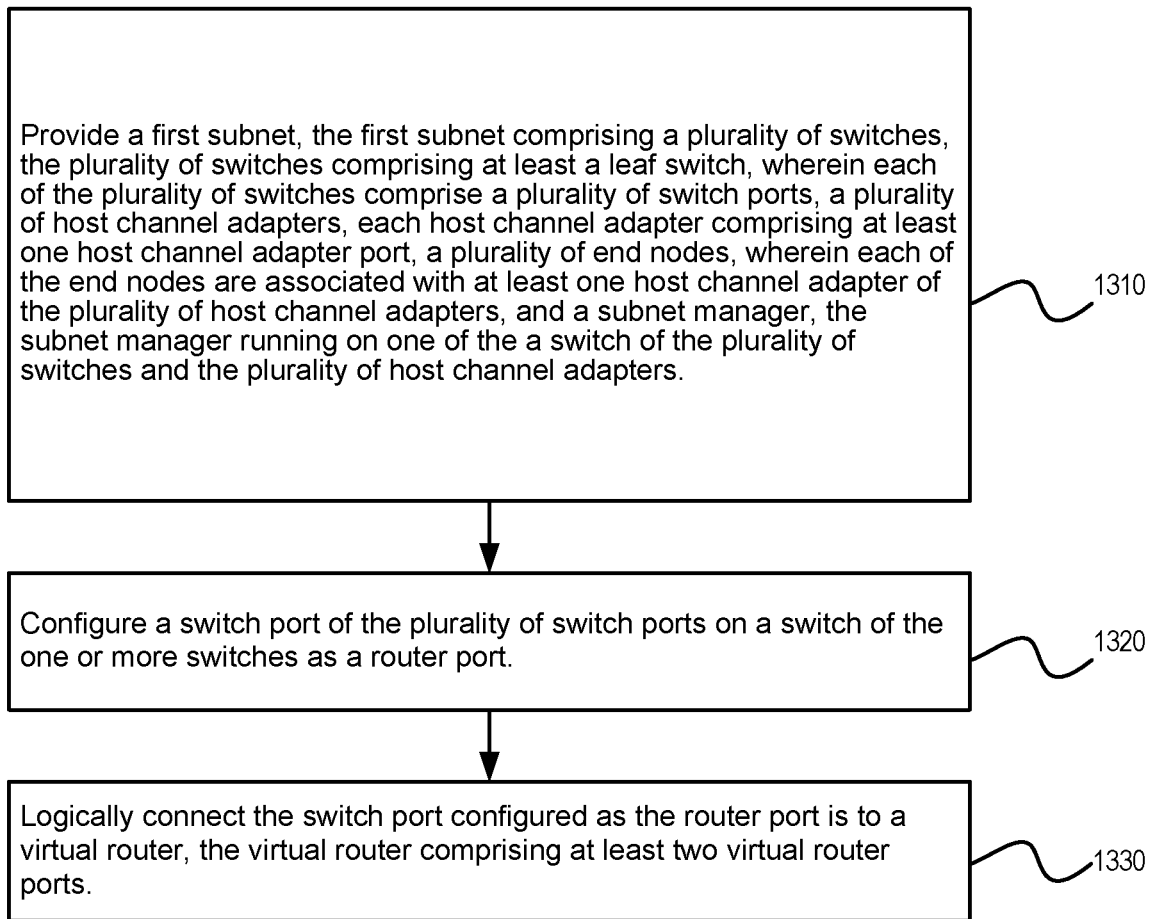
FIG. 13 shows a flowchart of a method for supporting dual-port virtual router in a high performance computing environment, in accordance with an embodiment.

FIG. 13 shows a method for supporting dual-port virtual router in a high performance computing environment, in accordance with an embodiment. At step 1310, the method can provide at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, and a subnet manager, the subnet manager running on one of the plurality of switches and the plurality of host channel adapters.

At step 1320, the method can configure a switch port of the plurality of switch ports on a switch of the plurality of switches as a router port.

At step 1330, the method can logically connect the switch port configured as the router port to a virtual router, the virtual router comprising at least two virtual router ports.

Ensuring Unique Multicast across Multiple Connected Subnets

In accordance with an embodiment, a system can support multicast routing. Multicast routing is a one-to-many/many-to-many communication paradigm designed to simplify and improve the efficiency of communication between a set of end nodes (e.g., hosts, virtual machines . . . etc.).

In accordance with an embodiment, in a single subnet system, a multicast group can be identified by a unique GID. End nodes can be joined to or leave a multicast group through a management action where the node supplies the identity (GID) for each port that will participate. This information can be distributed to the switches. Each switch is configured with routing information for the multicast traffic which specifies all of the local switch ports where the packet is addressed to travel. Care is taken to assure there are no loops (i.e., a single spanning tree such that a packet is not forwarded to a switch that already processed that packet).

In accordance with an embodiment, the node uses the multicast LID and GID in all packets it sends to that multicast group. When a switch receives a multicast packet (i.e., a packet with a multicast LID in the packet's DLID field) it replicates the packet and sends it out to each of the designated ports except the arrival port. In this fashion, each cascaded switch replicates the packet such that the packet arrives only once at every subscribed end node.

In accordance with an embodiment, a channel adapter may limit the number of QPs that can register for the same multicast address. The channel adapter distributes multicast packets to QPs registered for that multicast address. A single QP can be registered for multiple addresses for the same port but if a consumer wishes to receive multicast traffic on multiple ports it needs a different QP for each port. The channel adapter recognizes a multicast packet by the packet's DLID or by the special value in the packet's Destination QP field and routes the packet to the QPs registered for that address and port.

In accordance with an embodiment, multicast routing within interconnected subnets requires a global view and a single global spanning tree in order to ensure that a single multicast packet is not delivered more than once to each potential receiver end-point.

In accordance with an embodiment, by enforcing that incoming (i.e., incoming on a router port of a subnet) multicast packets have SGIDs (source global identifiers) that correspond to a restricted set of source subnet numbers when entering the ingress router ports to a local subnet, it is possible to ensure that multicast packets sent from one subnet are never returned to the same subnet through a different set of connected router ports (i.e., avoid looping multicast packets).

In accordance with an embodiment, in a situation with two directly connected subnets, such loop avoidance can be achieved by enforcing that all incoming multicast packets have the source subnet prefix that corresponds to the neighbor subnet. Put another way, in order to enforce loop avoidance, MC packets received at an ingress port of a router within a subnet can be checked to determine if the inbound MC packet comprises a subnet prefix that is the same as the subnet prefix of the subnet at which the MC packet is received. If so, the packet can be dropped at the router in order to avoid a loop.

Figure 14:
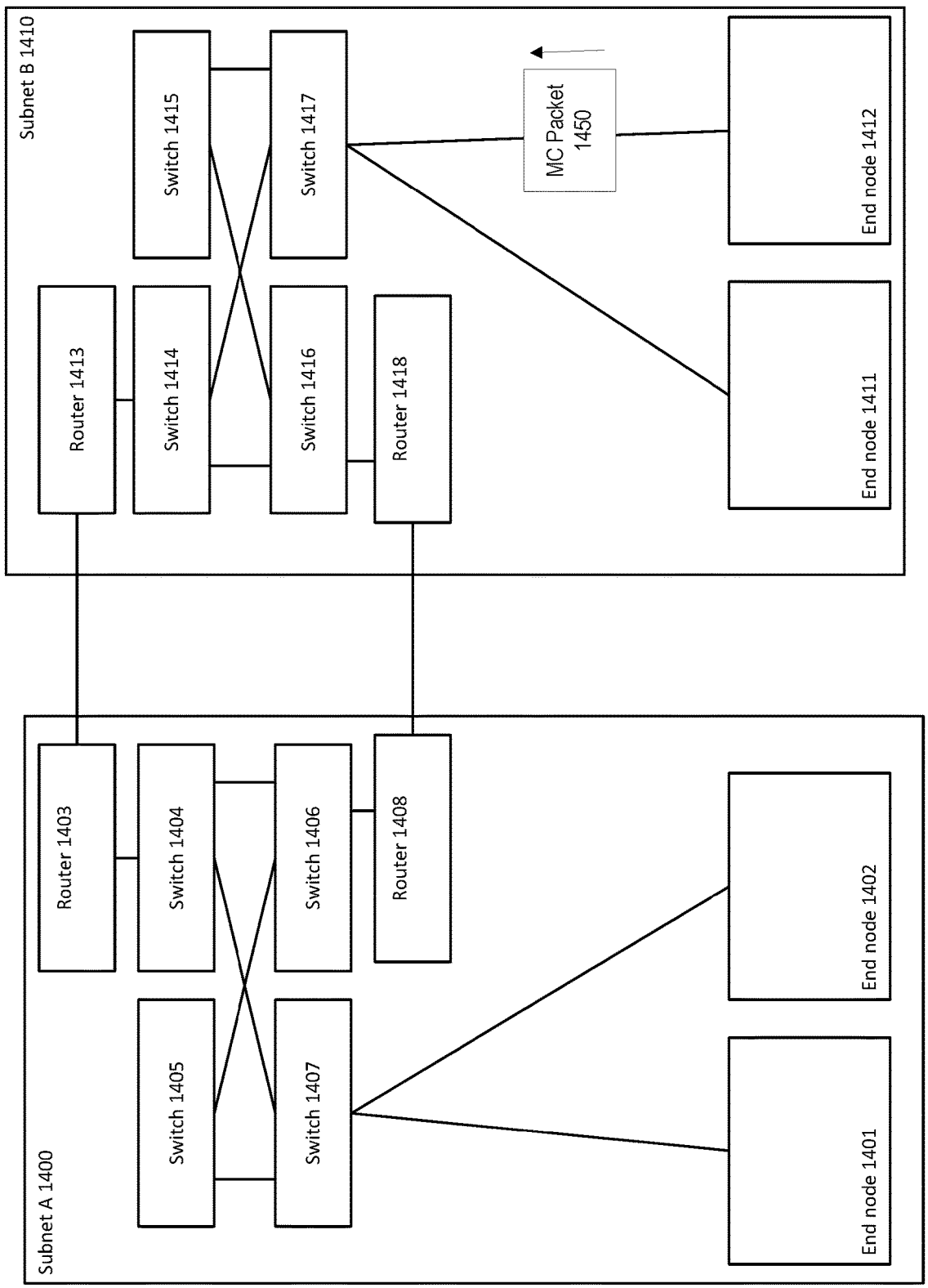
FIG. 14 illustrates a system for supporting unique multicast forwarding across multiple subnets in a high performance computing environment, in accordance with an embodiment.

FIG. 14 illustrates a system for supporting unique multicast forwarding across multiple subnets in a high performance computing environment, in accordance with an embodiment.

In accordance with an embodiment, a system can comprise two or more subnets, such as subnet A 1400 and subnet B 1410. Subnets A and B can comprise a number of end nodes, respectively, such as end node 1401, end node 1402, end node 1411, and end node 1412. In an effort for simplicity, the configuration of the end nodes is not explicitly shown in the figure. One of ordinary skill in the art will understand that the end nodes can comprise a number of configurations, such as those described above in relation to physical end nodes, virtual machines, virtual switches, and the like. Subnet A can additionally comprise a number of switches, representatively shown as switches 1404-1407, and a number of routers, such as routers 1403 and 1408. Subnet B can likewise additionally comprise a number of switches, representatively shown as switches 1414-1417, and a number of routers, such as routers 1413 and 1418. It is to be understood that the routers, although shown as separate components, can also comprise a virtual router, such as the dual-port virtual router configuration.

For example, in accordance with an embodiment, after configuration, a dual-port virtual router configuration can be provided such that a subnet manager sees a proper end node, signifying an end of the subnet that the subnet manager is responsible for. In accordance with an embodiment, at a switch 1404 in subnet A 1400, a switch port can be connected (i.e., logically connected) to a router port in a virtual router 1405 via a virtual link. The virtual router 1403 (e.g., a dual-port virtual router), which while shown as being external to the switch 1404 can, in embodiments, be logically contained within the switch 1404, can also comprise a second router port, router port II. In accordance with an embodiment, a physical link, which can have two ends, can connect the subnet A 1400 via first end of the physical link with subnet B 1401 via a second end of the physical link, via router ports at the routers in the different subnets.

In accordance with an embodiment, end node 1412 can initiate an MC packet 1450. The MC packet 1450 can be associated with a number of different elements (not shown), such as a MCG (multicast group—representing a list of addresses to which the MC packet needs to be distributed), as well as an SGID (source global identifier). The SGID, in addition to indicating the source of the MC packet 1450, additionally comprises a source subnet identifier, identifying the source of the MC packet as subnet B 1410.

In accordance with an embodiment, end nodes can be joined to or leave a multicast group through a management action where the node supplies the LID for each port that will participate. This information can be distributed to the switches. Each switch is configured with routing information for the multicast traffic which specifies all of the ports where the packet is addressed to travel. Care is taken to assure there are no loops (i.e., a single spanning tree such that a packet is not forwarded to a switch that already processed that packet).

In accordance with an embodiment, the node uses the multicast LID and GID in all packets it sends to that multicast group. When a switch receives a multicast packet (i.e., a packet with a multicast LID in the packet's DLID field) it replicates the packet and sends it out to each of the designated ports except the arrival port. In this fashion, each cascaded switch replicates the packet such that the packet arrives only once at every subscribed end node.

In accordance with an embodiment, each MC packet is originated from a source node/host—that source comprises a layer 3 source address, which is unique source address, and also has a layer 3 destination addresses which represents the group (128 bit global id). A MC packet is a packet of a special class that comprises a global router header regardless of whether it is only sent within a local subnet or if it is sent inter-subnet. In accordance with an embodiment, the source address comprises the source subnet number of the originating node. In the case of directly connected subnets, any packet received from a port connected to the remote subnet can have a source address representing the Subnet ID of the peer subnet.

Figure 15:
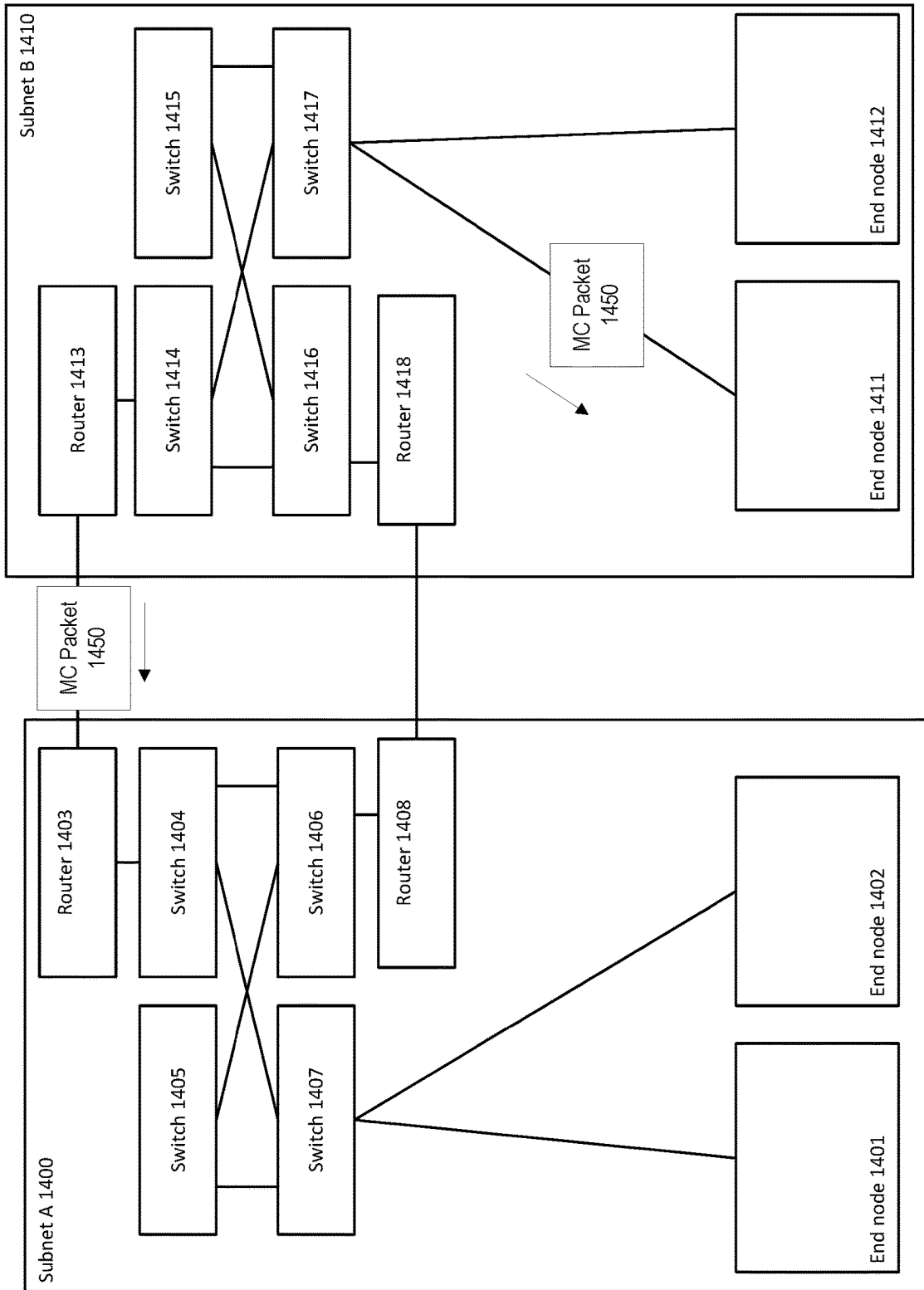
FIG. 15 illustrates a system for supporting unique multicast forwarding across multiple subnets in a high performance computing environment, in accordance with an embodiment.

In accordance with an embodiment, as shown in FIG. 15, which illustrates a system for supporting unique multicast forwarding across multiple subnets in a high performance computing environment, in accordance with an embodiment, once the MC packet arrives at a switch, such as switch 1417, the switch, as determined by the existing routing tables and MCG tables in memory at the switch, replicates the MC packet 1450 and addresses it to the different locations. In the situation shown in FIG. 15, the MC packet 1450 is forwarded to end node 1411, as well as across a link between router 1413 and router 1403, into subnet A 1400.

Figure 16:
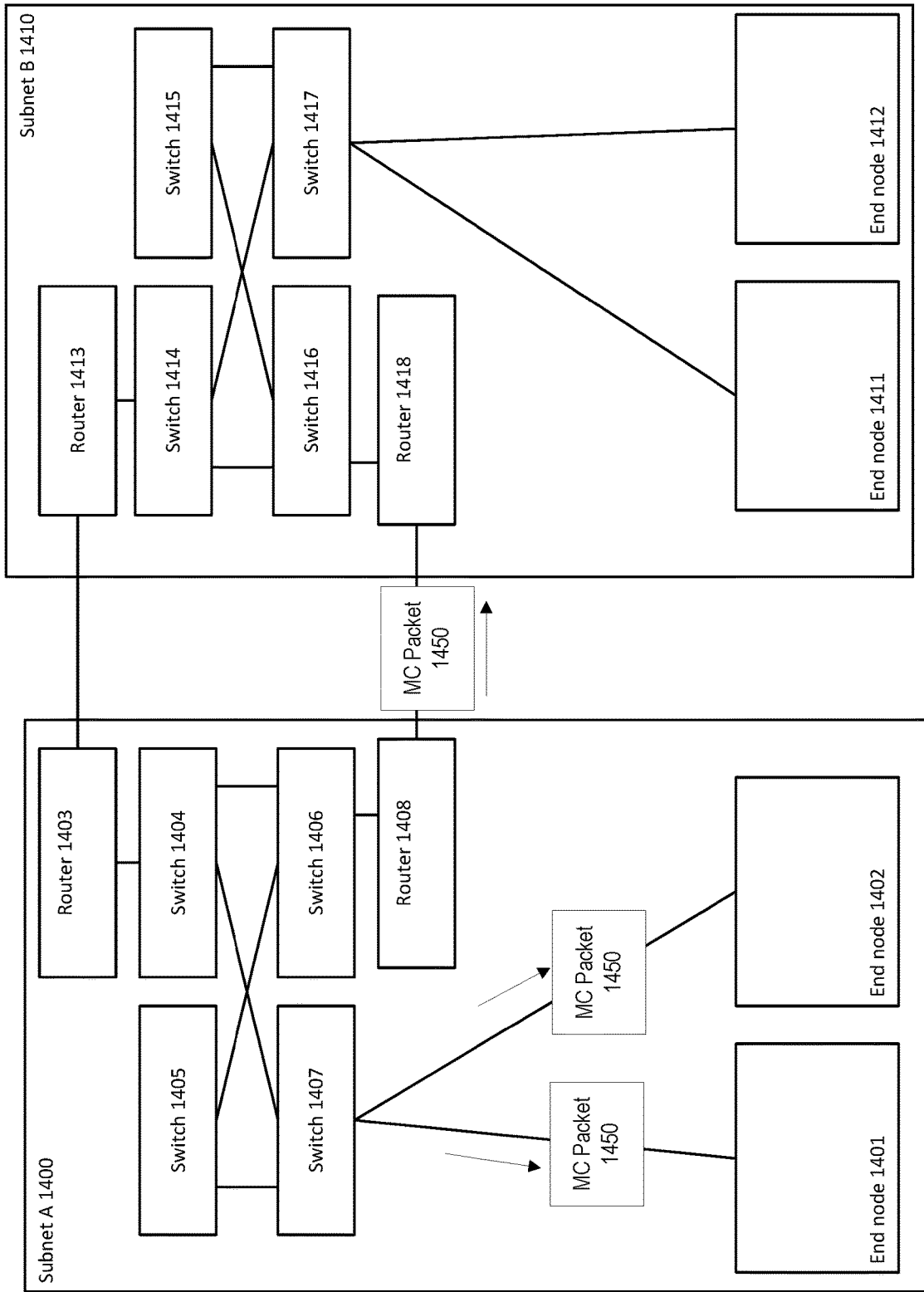
FIG. 16 illustrates a system for supporting unique multicast forwarding across multiple subnets in a high performance computing environment, in accordance with an embodiment.

In accordance with an embodiment, as shown in FIG. 16, which illustrates a system for supporting unique multicast forwarding across multiple subnets in a high performance computing environment, in accordance with an embodiment, once the MC packet arrives in subnet A 1400, the MC packet is replicated an additional number of times. For example, switch 1404 can replicate the MC packet such that the packet is addressed to end nodes 1401 and 1402. However, because the MC packet is replicated and sent out across the paths, excluding the originating path, the MC packet 1450 can also be addressed back to subnet B 1410 on a link between router 1408 and 1418.

Figure 17:
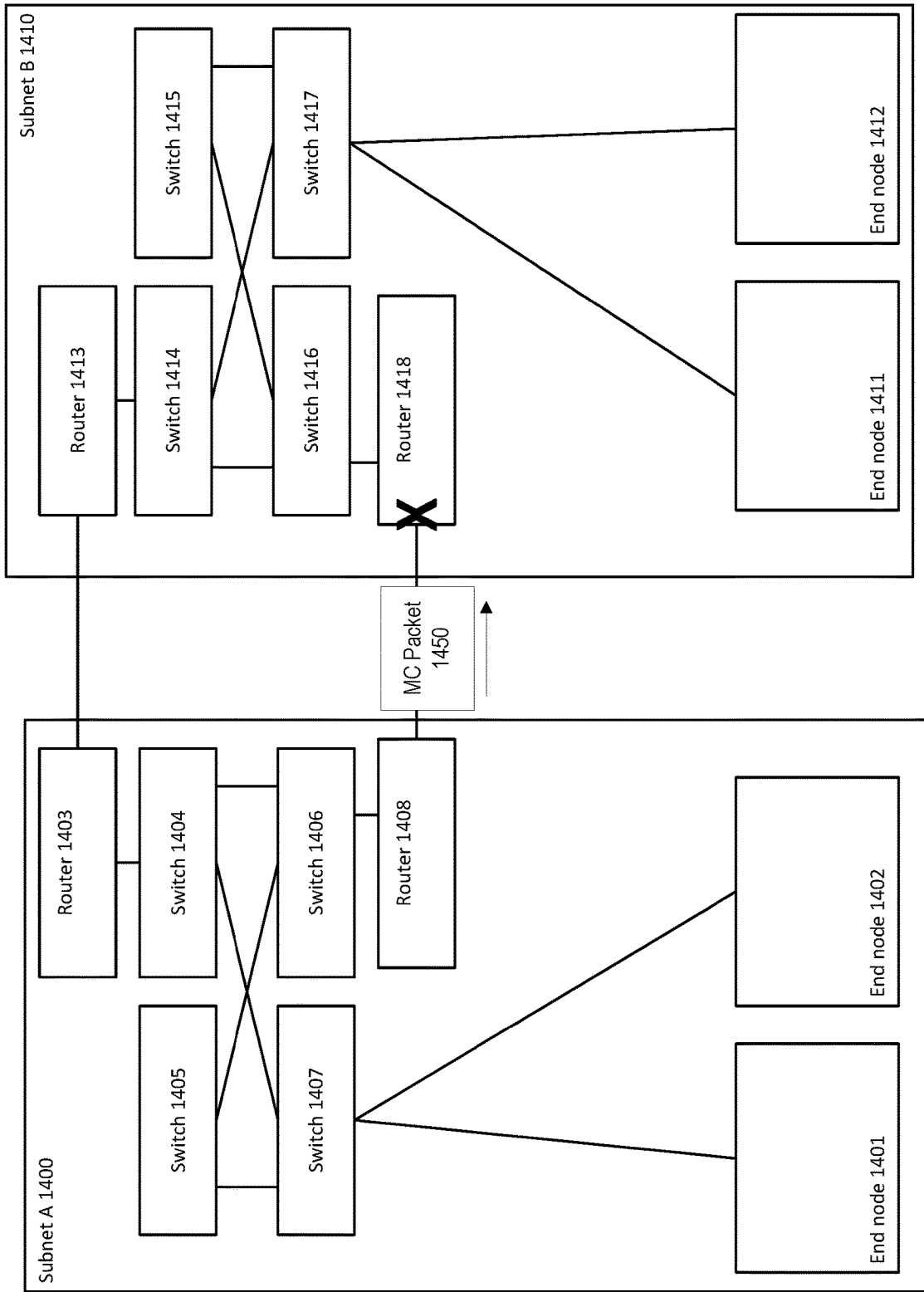
FIG. 17 illustrates a system for supporting unique multicast forwarding across multiple subnets in a high performance computing environment, in accordance with an embodiment.

In accordance with an embodiment, as shown in FIG. 17, which illustrates a system for supporting unique multicast forwarding across multiple subnets in a high performance computing environment, in accordance with an embodiment, once the MC packet arrives at an ingress port at router 1418, the router 1418 can read the packet header of the MC packet 1450. Because the packet header of MC packet 1450 comprises the SGID identifying subnet B as the source of the MC packet, router 1418 can determine, by, for example, comparing the source identifier of MC Packet 1450 with the identity of the subnet in which router B resides, that the MC packet originated in subnet B (i.e., compare the source subnet number of the MC packet with the subnet that the MC packet arrives at). If the determination reveals that the MC packet is arriving at the subnet in which the MC packet originated, the router can drop the MC packet so as to avoid a loop. In other words, at ingress, the router port verifies that the source subnet number is not the local subnet number.

Figure 18:
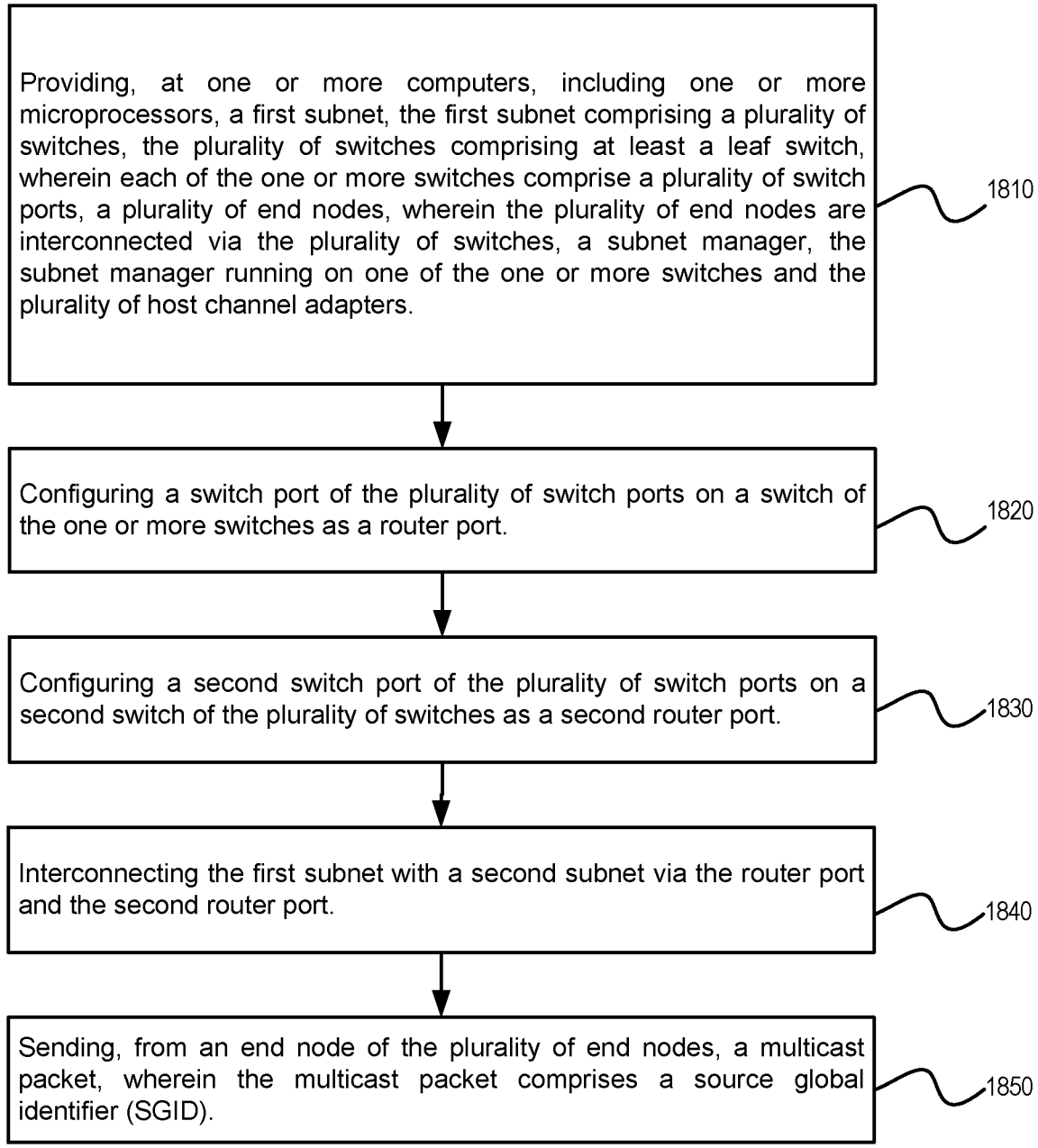
FIG. 18 is a flow chart of a method for supporting unique multicast forwarding across multiple subnets in a high performance computing environment, in accordance with an embodiment.

FIG. 18 is a flow chart of a method for supporting unique multicast forwarding across multiple subnets in a high performance computing environment, in accordance with an embodiment.

At step 1810, the method can provide, at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein the plurality of end nodes are interconnected via the plurality of switches, and a subnet manager, the subnet manager running on one of the plurality of switches and the plurality of end nodes.

At step 1820, the method can configure a switch port of the plurality of switch ports on a switch of the plurality of switches as a router port.

At step 1830, the method can configure a second switch port of the plurality of switch ports on a second switch of the plurality of switches as a second router port.

At step 1840, the method can interconnect the first subnet with a second subnet via the router port and the second router port.

At step 1850, the method can send, from an end node of the plurality of end nodes, a multicast packet, wherein the multicast packet comprises a source global identifier (SGID).

In accordance with an embodiment, each router port can check the SGID of multicast packets arriving from the peer subnet via the physical link, and discard any such multicast packets that have an SGID that represents the same Subnet ID as the local subnet.

Supporting Resource Quotas for Multicast Group Creation and Membership

In accordance with an embodiment, certain partitions can be classified as "Inter Subnet Partitions" (also referred to herein as ISPs). When such certain partitions are thus classified, subnet management entities (e.g., SMs or inter-subnet managers (ISMs)) can ensure that only properly classified partitions are allowed to be used for data traffic to remote subnets.

In accordance with an embodiment, a global management entity, such as an Inter Subnet Manager (ISM) can allocate a certain P_Key range within which all ISPs can reside (i.e., any ISP in such an environment must have a P_Key within the P_Key range as defined by the ISM). By ensuring that ISPs are allocated from a specific P_Key range, it is possible to ensure that some P_Key ranges can be used for different purposes by different subnets while P_Key ranges used for ISPs are used consistently by all relevant subnets.

In accordance with an embodiment, by observing which end-nodes are members of which ISPs and correlating this with what local router ports are members of the same ISPs, the set of possible inter subnet paths can be determined both within each local subnet as well as between connected subnets.

In accordance with an embodiment, by observing that directly connected router ports from different subnets are both members of the same set of ISPs, it can be determined that configuration is consistent in both subnets without exchanging additional information between the subnets.

In accordance with an embodiment, unicast packets are sent from a source node to a destination node—that is, a one-to-one communication path. Address information for unicast packets can be found in the packet header. Switches and routers, upon receiving the unicast packet, look up the address information and forward the packet accordingly.

In accordance with an embodiment, and in contrast to unicast packets, multicast (MC) packets are sent on a one-to-many basis. An MC packet is sent to all ports of a collection of ports, which is termed a multicast group. Within a subnet, different multicast groups can be defined, with each multicast group being associated with a unique multicast local identifier (MLID), which is used within the subnet to direct the MC packet to the members of the MC group. This MLID is contained in the header of an MC packet, much like the DLID (destination local identifier) for unicast packets.

In accordance with an embodiment, when an MC packet is sent within a subnet, each switch uses the MLID of the MC group to which that MC packet is to be delivered. The switches, based upon the MLID contained in the packet header, replicate the MC packet and forward the replications to the appropriate ports, as previously mapped by the subnet manager.

In accordance with an embodiment, since multicast groups can be created by any host node during run-time, there is a need to be able to constrain the amounts of resources that can be consumed in terms of both MLID values local to the subnet as well as in terms of address mapping resources in router ports.

In accordance with an embodiment, the number of MLIDs can be constrained by re-using the same MLID (or set of MLIDs) for the multicast groups associated with the same partition (P_Key). Hence, in the general case, each defined partition may consume at least one MLID in the local subnet, and a quota mechanism can then define that a specific partition is allowed to consume from zero to N MLIDs (where zero implies no multicast within that certain partition), whereas N>1 implies the ability to avoid flooding all multicast traffic for that partition onto a single spanning three that represents the union of all multicast members for any multicast group in the relevant partition.

In accordance with an embodiment, unicast handling is different in that end-nodes by default cannot allocate new resources that requires allocation of new unicast LIDs. However, relative to address mappings through router ports, the number of unicast LIDs that can be reached via different ISPs implies a potential resource conflict.

In accordance with an embodiment, in the case of ISP based multicast groups, another constraint is the number of router address mappings that can be consumed since each MGID (multicast global identification) utilizes one router address map entry for each relevant connected subnet. Hence, a quota scheme can define a maximum number of MGIDs that can be created for each ISP/remote subnet combinations.

In accordance with an embodiment, put another way, a problem with MC groups spanning subnets is that when an MC packet crosses a subnet boundary (e.g., router-router communication) each MGID requires a single unique mapping entry. This then brings up resource/address space consumption issues.

In accordance with an embodiment, in order to prevent runaway in-band allocation in one partition from allocating MLIDs and thus preventing other partitions from establishing their own multicast groups, a resource quota can be provided for each ISP that specifies how many multicast groups can be created that require a different router map entry. Each ISP can be allocated, via the quota resource, a number of MC groups that are allowed to be created. This quota can be set on a per-partition basis, and each quota per partition can be allocated in terms of what is needed by each partition, as well as what is reasonable for each partition. In this way, it can be assured that the number of map entries available between connected subnets is sufficient to provide the needed connectivity. Based on that, it is then possible to ensure that both the set of end nodes that are available between the subnets, combine with the MC groups, is bound to a level that a router map capacity between the two subnets is allowed. This quota can ensure that an ISP does not "runaway" by dynamically creating MC groups, thus depleting the number of map entries allowed at a router, and thus starving off all other traffic that would otherwise flow through the router ports.

Figure 19:
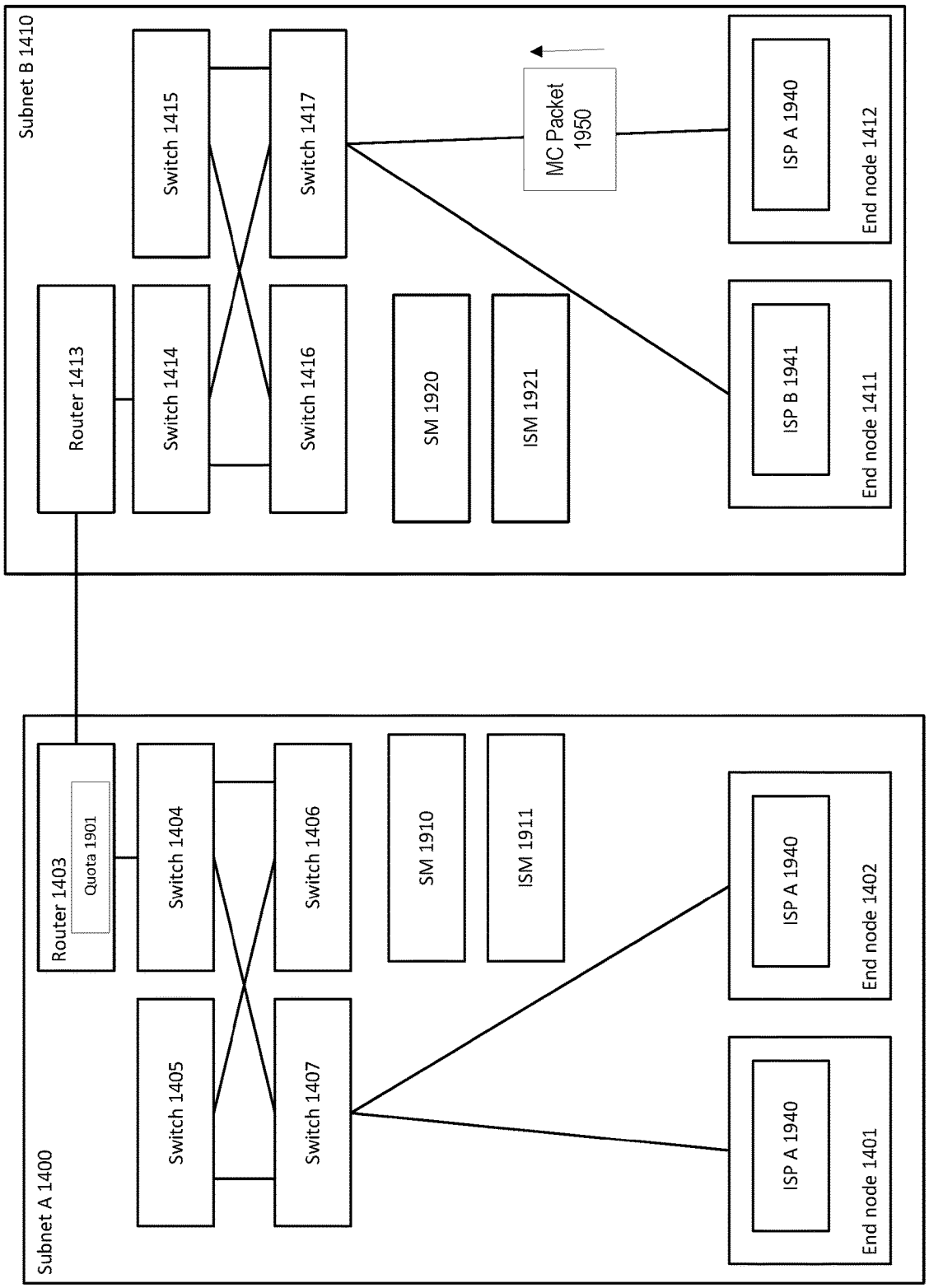
FIG. 19 illustrates a system for supporting resource quotas for multicast membership in a high performance computing environment, in accordance with an embodiment.

FIG. 19 illustrates a system for supporting resource quotas for multicast membership in a high performance computing environment, in accordance with an embodiment.

In accordance with an embodiment, a system can comprise two or more subnets, such as subnet A 1400 and subnet B 1410. Subnets A and B can comprise a number of end nodes, respectively, such as end node 1401, end node 1402, end node 1411, and end node 1412. In an effort for simplicity, the configuration of the end nodes is not explicitly shown in the figure. One of ordinary skill in the art will understand that the end nodes can comprise a number of configurations, such as those described above in relation to physical end nodes, virtual machines, virtual switches, and the like. Subnet A can additionally comprise a number of switches, representatively shown as switches 1404-1407, and a number of routers, such as routers 1403 and 1408. Subnet B can likewise additionally comprise a number of switches, representatively shown as switches 1414-1417, and a number of routers, such as routers 1413 and 1418. It is to be understood that the routers, although shown as separate components, can also comprise a virtual router, such as the dual-port virtual router configuration.

For example, in accordance with an embodiment, after configuration, a dual-port virtual router configuration can be provided such that a subnet manager sees a proper end node, signifying an end of the subnet that the subnet manager is responsible for. In accordance with an embodiment, at a switch 1404 in subnet A 1400, a switch port can be connected (i.e., logically connected) to a router port in a virtual router 1403 via a virtual link. The virtual router 1403 (e.g., a dual-port virtual router), which while shown as being external to the switch 1404 can, in embodiments, be logically contained within the switch 1404, can also comprise a second router port, router port II. In accordance with an embodiment, a physical link, which can have two ends, can connect the subnet A 1400 via first end of the physical link with subnet B 1401 via a second end of the physical link, via router ports at the routers in the different subnets.

In accordance with an embodiment, a SM 1910 within subnet A 1400 can process a multicast group join request for the multicast group's global ID (i.e., the corresponding MGID) to be associated with an ISP. Upon successful joint (and associated with the ISP), a local ISM, such as ISM 1911, can be notified, and the local ISM can notify any neighbor ISMs (i.e., ISMs in connected subnets, such as ISM 1902). The join request can also trigger an allocation of an MLID to the multicast group.

In accordance with an embodiment, each ISM can select a router port that it can set up as member of the MCG (i.e., for forwarding outgoing MCG traffic). For example, in the figure, ISM 1911 can select a local port of router 1403 as a member of the MCG. This router port is identified to the relevant remote ISM and each of the two ISMs can then set up the corresponding router port in its respective subnet to perform translation from the relevant (global) MGID to the relevant (subnet local) MLID. When this is completed, any relevant MCG packet generated by an end-node in either subnet (e.g., such as end node 1411 or 1412 in subnet B), can reach all end-port members in either subnet.

In accordance with an embodiment, a resource quota 1901 can additionally be set up at the router 1403. The resource quota 1901 is put in place in order to prevent runaway in-band allocation in one partition from allocating new MCGs that can lead to allocation of additional MLIDs as well as router address mapping resources, and thus prevent other partitions from establishing their own multicast groups, a quota resource 1901 can be provided for each ISP (such as ISP A 1940 and ISP B 1941 shown in the figure) that specifies how many multicast groups can be created that require a different router map entry.

In accordance with an embodiment, each ISP can be allocated (via the SM, or the ISM) a number of MC groups that are allowed to be created. For example, as shown in the figure, MC packet 1950 is originated at end node 1412 in subnet B 1410. This MC packet is associated with ISP A 1940. A multicast group is created that is associated with ISP A, and this multicast group counts against the quota 1901 allocated to ISP A for the creation of multicast groups.

In accordance with an embodiment, if ISP A has already filled its quota 1901 of multicast groups allowed within subnet A by quota 1901, the multicast packet 1950 cannot pass into subnet A. This quota can ensure that an ISP does not "runaway" by dynamically creating MC groups, thus depleting the number of map entries allowed at a router, and thus starving off all other traffic that would otherwise flow through the router ports.

Figure 20:
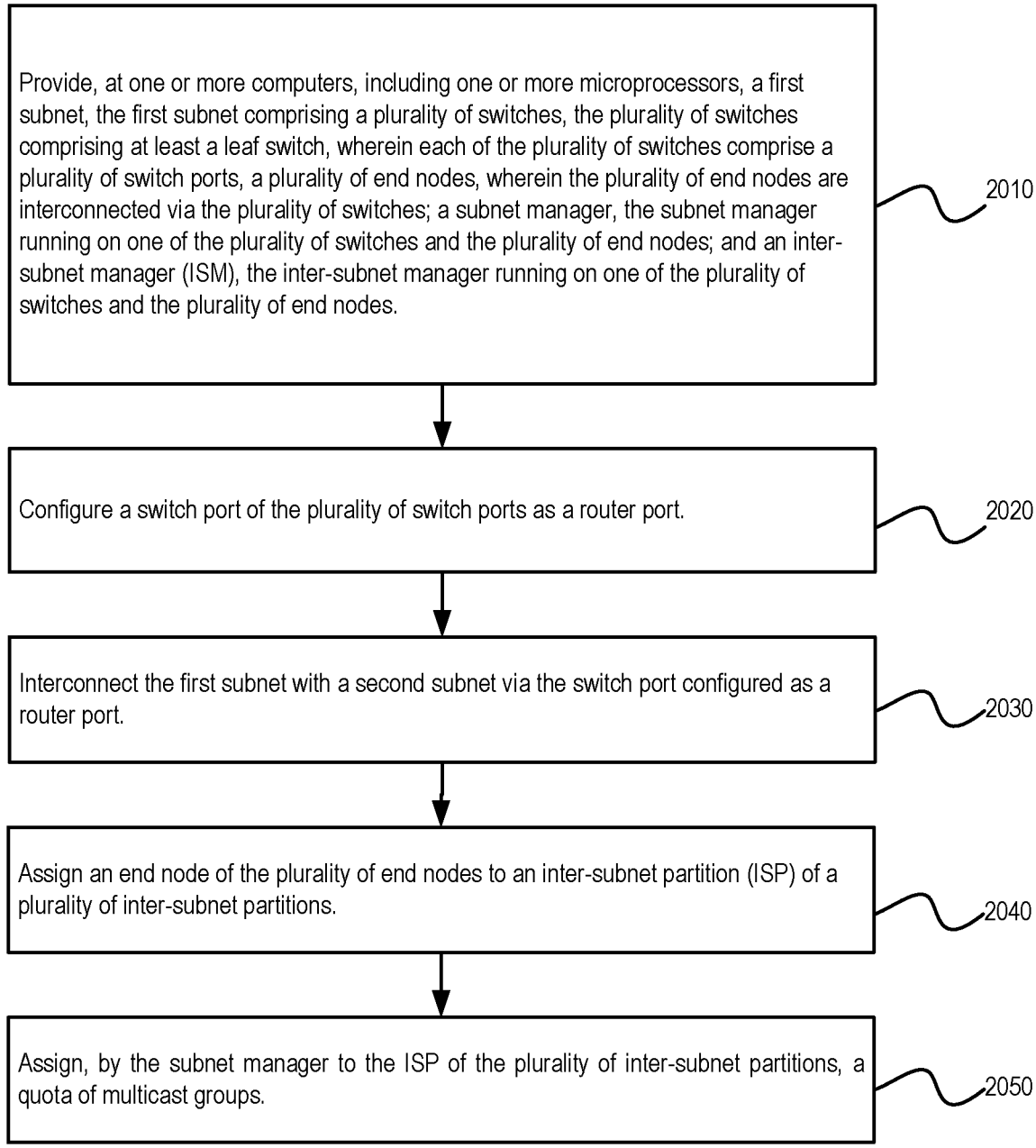
FIG. 20 is a flow chart of a method for supporting resource quotas for multicast membership in a high performance computing environment.

FIG. 20 is a flow chart of a method for supporting resource quotas for multicast membership in a high performance computing environment.

At step 2010, the method can provide, at one or more computers, including one or more microprocessors, a first subnet, the first subnet comprising a plurality of switches, the plurality of switches comprising at least a leaf switch, wherein each of the plurality of switches comprise a plurality of switch ports, a plurality of end nodes, wherein the plurality of end nodes are interconnected via the plurality of switches; a subnet manager, the subnet manager running on one of the plurality of switches and the plurality of end nodes; and an inter-subnet manager (ISM), the inter-subnet manager running on one of the plurality of switches and the plurality of end nodes.

At step 2020, the method can configure a switch port of the plurality of switch ports as a router port.

At step 2030, the method can interconnect the first subnet with a second subnet via the switch port configured as a router port.

At step 2040, the method can assign an end node of the plurality of end nodes to an inter-subnet partition (ISP) of a plurality of inter-subnet partitions.

At step 2050, the method can assign, by the subnet manager to the ISP of the plurality of inter-subnet partitions, a quota of multicast groups.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting resource quotas for multicast group creation and membership in a high performance computing environment, comprising:
   one or more microprocessors;
   a first subnet, the first subnet comprising
      a plurality of switches of the first subnet,
      a plurality of end nodes of the first subnet, wherein the plurality of end nodes of the first subnet are interconnected via the plurality of switches of the first subnet, wherein the plurality of end nodes comprises at least a virtual machine,
      a plurality of host channel adapters, wherein at least one of the host channel adapters comprises at least one virtual function, at least one virtual switch, and at least one physical function, wherein the plurality of host channel adapters is interconnected via the plurality of switches, wherein the at least one virtual machine is associated with the at least one virtual function;
a hypervisor, wherein the hypervisor is associated with the at least one host channel adapter of the plurality of host channel adapters,
a subnet manager of the first subnet, the subnet manager running on one of the plurality of switches of the first subnet, and
an inter-subnet manager (ISM) of the first subnet, the inter-subnet manager of the first subnet running on one of the plurality of switches of the first subnet;
wherein a switch port on a switch of the plurality of switches of the first subnet is configured as a router port, the router port comprising a first router map capacity;
wherein the first subnet is interconnected with a second subnet via the switch port configured as a router port;
wherein an end node of the plurality of end nodes of the first subnet is assigned to an inter-subnet partition (ISP) of a plurality of inter-subnet partitions; and
wherein the subnet manager assigns to the ISP of the plurality of inter-subnet partitions a quota of multicast groups, the assigned quota of multicast groups being based at least on the first router map capacity.

2. The system of claim 1, wherein the quota of multicast groups comprises a non-zero limit on a number of multicast groups associated with the ISP of the plurality of inter-subnet partitions that is allowed to be created within the first subnet.

3. The system of claim 1,
wherein the second subnet comprises:
a plurality of switches of the second subnet,
a plurality of end nodes of the second subnet, wherein the plurality of end nodes of the second subnet are interconnected via the plurality of switches of the second subnet,
a subnet manager of the second subnet, the subnet manager of the second subnet running on one of the plurality of switches of the second subnet, and
an inter-subnet manager (ISM) of the second subnet, the inter-subnet manager of the second subnet running on one of the plurality of switches of the second subnet;
wherein a switch port on a switch of the plurality of switches of the second subnet is configured as a router port of the second subnet, the router port of the second comprising a second router map capacity;
wherein an end node of the second subnet of the plurality of end nodes of the second subnet is assigned to the inter-subnet partition (ISP) of a plurality of inter-subnet partitions; and
wherein the subnet manager of the second subnet assigns to the ISP of the plurality of inter-subnet partitions a quota of multicast groups of the second subnet, the assigned quota of multicast groups of the second subnet being based at least on the second router map capacity.

4. The system of claim 3, wherein the quota of multicast groups of the second subnet comprises a non-zero limit of the second subnet on a number of multicast groups of the second subnet associated with the ISP of the plurality of inter-subnet partitions that is allowed to be created within the second subnet.

5. The system of claim 4,
wherein upon attempting to create a new multicast group within the first subnet, such that the creation of the new multicast group would exceed the non-zero limit of the associated ISP, the subnet manager denies creation of the new multicast group.

6. The system of claim 4,
wherein upon the attempting to create a new multicast group within the second subnet, such that the creation of the new multicast group would exceed the non-zero limit of the second subnet of the associated ISP, the subnet manager denies creation of the new multicast group.

7. A method for supporting resource quotas for group creation and multicast membership in a high performance computing environment, comprising:
providing, at one or more computers, including one or more microprocessors, a first subnet, the first subnet comprising
a plurality of switches of the first subnet,
a plurality of end nodes of the first subnet, wherein the plurality of end nodes of the first subnet are interconnected via the plurality of switches of the first subnet, wherein the plurality of end nodes comprises at least a virtual machine,
a plurality of host channel adapters, wherein at least one of the host channel adapters comprises at least one virtual function, at least one virtual switch, and at least one physical function, wherein the plurality of host channel adapters is interconnected via the plurality of switches wherein the at least one virtual machine is associated with the at least one virtual function;
a hypervisor, wherein the hypervisor is associated with the at least one host channel adapter of the plurality of host channel adapters,
a subnet manager of the first subnet, the subnet manager running on one of the plurality of switches of the first subnet, and
an inter-subnet manager (ISM) of the first subnet, the inter-subnet manager of the first subnet running on one of the plurality of switches of the first subnet;
configuring a switch port on a switch of the plurality of switches of the first subnet as a router port, the router port comprising a first router map capacity;
interconnecting the first subnet with a second subnet via the switch port configured as a router port;
assigning an end node of the plurality of end nodes of the first subnet to an inter-subnet partition (ISP) of a plurality of inter-subnet partitions; and
assigning, by the subnet manager to the ISP of the plurality of inter-subnet partitions, a quota of multicast groups, the assigned quota of multicast groups being based at least on the first router map capacity.

8. The method of claim 7, wherein the quota of multicast groups comprises a non-zero limit on a number of multicast groups associated with the ISP of the plurality of inter-subnet partitions that is allowed to be created within the first subnet.

9. The method of claim 7, further comprising:
wherein the second subnet comprises:
a plurality of switches of the second subnet,
a plurality of end nodes of the second subnet, wherein the plurality of end nodes of the second subnet are interconnected via the plurality of switches of the second subnet,
a subnet manager of the second subnet, the subnet manager of the second subnet running on one of the plurality of switches of the second subnet, and an inter-subnet manager (ISM) of the second subnet, the inter-subnet manager of the second subnet running on one of the plurality of switches of the second subnet;

configuring a switch port on a switch of the plurality of switches of the second subnet as a router port of the second subnet, the router port of the second comprising a second router map capacity;

assigning an end node of the second subnet of the plurality of end nodes of the second subnet to the inter-subnet partition (ISP) of a plurality of inter-subnet partitions; and assigning, by the subnet manager of the second subnet, to the ISP of the plurality of inter-subnet partitions a quota of multicast groups of the second subnet, the assigned quota of multicast groups of the second subnet being based at least on the second router map capacity.

10. The method of claim 9, wherein the quota of multicast groups of the second subnet comprises a non-zero limit of the second subnet on a number of multicast groups of the second subnet associated with the ISP of the plurality of inter-subnet partitions that is allowed to be created within the second subnet.

11. The method of claim 10, further comprising:
upon the ISP attempting to create a new multicast group within the first subnet, such that the creation of the new multicast group would exceed the non-zero limit, denying, by the subnet manager, creation of the new multicast group.

12. The method of claim 10, further comprising:
upon the ISP attempting to create a new multicast group within the second subnet, such that the creation of the new multicast group would exceed the non-zero limit of the second subnet, denying, by the subnet manager of the second subnet, creation of the new multicast group.

13. A non-transitory computer readable storage medium, including instructions stored thereon for supporting resource quotas for multicast group creation and membership in a high performance computing environment, which when read and executed by one or more computers cause the one or more computers to perform steps comprising:
providing, at one or more computers, including one or more microprocessors, a first subnet, the first subnet comprising
a plurality of switches of the first subnet,
a plurality of end nodes of the first subnet, wherein the plurality of end nodes of the first subnet are interconnected via the plurality of switches of the first subnet, wherein the plurality of end nodes comprises at least a virtual machine,
a plurality of host channel adapters, wherein at least one of the host channel adapters comprises at least one virtual function, at least one virtual switch, and at least one physical function, wherein the plurality of host channel adapters is interconnected via the plurality of switches wherein the at least one virtual machine is associated with the at least one virtual function;
a hypervisor, wherein the hypervisor is associated with the at least one host channel adapter of the plurality of host channel adapters,
a subnet manager of the first subnet, the subnet manager running on one of the plurality of switches of the first subnet, and an inter-subnet manager (ISM) of the first subnet, the inter-subnet manager of the first subnet running on one of the plurality of switches of the first subnet;

configuring a switch port on a switch of the plurality of switches of the first subnet as a router port, the router port comprising a first router map capacity;

interconnecting the first subnet with a second subnet via the switch port configured as a router port;

assigning an end node of the plurality of end nodes of the first subnet to an inter-subnet partition (ISP) of a plurality of inter-subnet partitions; and assigning, by the subnet manager to the ISP of the plurality of inter-subnet partitions, a quota of multicast groups, the assigned quota of multicast groups being based at least on the first router map capacity.

14. The non-transitory computer readable storage medium of claim 13, wherein the quota of multicast groups comprises a non-zero limit on a number of multicast groups associated with the ISP of the plurality of inter-subnet partitions that is allowed to be created within the first subnet.

15. The non-transitory computer readable storage medium of claim 13, further comprising:
wherein the second subnet comprises:
a plurality of switches of the second subnet,
a plurality of end nodes of the second subnet, wherein the plurality of end nodes of the second subnet are interconnected via the plurality of switches of the second subnet,
a subnet manager of the second subnet, the subnet manager of the second subnet running on one of the plurality of switches of the second subnet, and
an inter-subnet manager (ISM) of the second subnet, the inter-subnet manager of the second subnet running on one of the plurality of switches of the second subnet;
configuring a switch port on a switch of the plurality of switches of the second subnet as a router port of the second subnet, the router port of the second comprising a second router map capacity;
assigning an end node of the second subnet of the plurality of end nodes of the second subnet to the inter-subnet partition (ISP) of a plurality of inter-subnet partitions; and
assigning, by the subnet manager of the second subnet, to the ISP of the plurality of inter-subnet partitions a quota of multicast groups of the second subnet, the assigned quota of multicast groups of the second subnet being based at least on the second router map capacity.

16. The non-transitory computer readable storage medium of claim 15, wherein the quota of the multicast groups of the second subnet comprises a non-zero limit of the second subnet on a number of multicast groups associated with the ISP of the plurality of inter-subnet partitions is allowed to create within the second subnet.

17. The non-transitory computer readable storage medium of claim 16, the steps further comprising:
upon the ISP attempting to create a new multicast group within the first subnet, such that the creation of the new multicast group would exceed the non-zero limit, denying, by the subnet manager, creation of the new multicast group.

* * * * *

UNITED STATES PATENT AND TRADEMARK OFFICE
CERTIFICATE OF CORRECTION

PATENT NO. : 10,764,178 B2  
APPLICATION NO. : 16/269412  
DATED : September 1, 2020  
INVENTOR(S) : Johnsen et al.

Page 1 of 1

It is certified that error appears in the above-identified patent and that said Letters Patent is hereby corrected as shown below:

In the Specification

In Column 2, Line 27, after "embodiment" insert -- . --.

In Column 3, Line 48, delete ".inifinibandta." and insert -- .infinibandta. --, therefor.

In Column 3, Line 62, delete "(SR-10V)" and insert -- (SR-IOV) --, therefor.

In Column 4, Line 24, delete "datacenters." and insert -- data centers. --, therefor.

In Column 11, Line 8, delete "SRIOV" and insert -- SR-IOV --, therefor.

In Column 12, Line 26, after "PF" insert -- . --.

In Column 17, Line 56, delete "subnetA" and insert -- subnet A --, therefor.

In Column 17, Line 64, delete "subnetA" and insert -- subnet A --, therefor.

In Column 18, Line 5, delete "subnetA" and insert -- subnet A --, therefor.

In Column 18, Line 8, delete "subnetA" and insert -- subnet A --, therefor.

In Column 18, Line 9, delete "subnetA" and insert -- subnet A --, therefor.

In Column 18, Line 10, delete "InifiniBand" and insert -- InfiniBand --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*